US012377999B2

(12) United States Patent
Bosworth et al.

(10) Patent No.: US 12,377,999 B2
(45) Date of Patent: Aug. 5, 2025

(54) SYSTEMS AND METHODS FOR VIBRATION ATTENUATION IN FLIGHT CONTROL OF AN AIRCRAFT

(71) Applicant: Archer Aviation Inc., San Jose, CA (US)

(72) Inventors: Jeffrey Mark Bosworth, Argyle, TX (US); Abhishek Vaidya, San Jose, CA (US); Maicon Secchi, Sao Jose dos Campos (BR); Marcelo Santos, San Jose, CA (US)

(73) Assignee: Archer Aviation Inc., San Jose, CA (US)

( * ) Notice: Subject to any disclaimer, the term of this patent is extended or adjusted under 35 U.S.C. 154(b) by 15 days.

(21) Appl. No.: 18/750,785

(22) Filed: Jun. 21, 2024

(65) Prior Publication Data
US 2024/0400217 A1 Dec. 5, 2024

Related U.S. Application Data

(63) Continuation of application No. PCT/US2024/031454, filed on May 9, 2024.
(Continued)

(51) Int. Cl.
G06F 17/00 (2019.01)
B64D 31/16 (2024.01)
(Continued)

(52) U.S. Cl.
CPC ............ *B64D 31/16* (2024.01); *B64D 45/00* (2013.01); *B64C 29/0008* (2013.01); *B64D 2045/0085* (2013.01)

(58) Field of Classification Search
CPC ................... B64D 31/16; B64D 45/00; B64D 2045/0085; B64C 29/0008
(Continued)

(56) References Cited

U.S. PATENT DOCUMENTS 5,001,646 A    3/1991  Caldwell et al.
9,415,870 B1   8/2016  Beckman et al.
(Continued)

FOREIGN PATENT DOCUMENTS

EP    3891067 B1    1/2024
WO    2020180373 A2   9/2020

OTHER PUBLICATIONS

Effect of Propeller RPM on Speed, Efficiency, Noise, and Vibration (Year: 2017).*
(Continued)

*Primary Examiner* — Ronnie M Mancho
(74) *Attorney, Agent, or Firm* — Finnegan, Henderson, Farabow, Garrett & Dunner LLP

(57) ABSTRACT

The present disclosure relates generally to flight control of electric aircraft and other powered aerial vehicles. In one embodiment, an electrical system for an aircraft is disclosed, comprising: at least one processor configured to: receive pilot input indicating a commanded aircraft state, determine an aircraft thrust for achieving the commanded aircraft state, retrieve at least one propeller parameter associated with propeller speeds, wherein the propeller parameter is determined to reduce a structural vibratory response in the aircraft. The at least one processor is further configured to determine a respective command for each propeller of the aircraft to achieve the determined aircraft thrust based on the at least one propeller parameter and control each propeller of the aircraft based on the corresponding respective command.

30 Claims, 22 Drawing Sheets

Related U.S. Application Data

(60) Provisional application No. 63/578,075, filed on Aug. 22, 2023, provisional application No. 63/504,958, filed on May 30, 2023.

(51) Int. Cl.
 *B64D 45/00* (2006.01)
 *B64C 29/00* (2006.01)

(58) Field of Classification Search
 USPC .......................................................... 701/3
 See application file for complete search history.

(56) References Cited

U.S. PATENT DOCUMENTS

| | | | |
|---|---|---|---|
| 9,898,033 B1 | 2/2018 | Long | |
| 10,723,435 B2* | 7/2020 | Madjlesi | B64C 11/00 |
| 11,305,874 B2* | 4/2022 | Beckman | B64U 40/10 |
| 11,333,160 B2* | 5/2022 | Seeley | F04D 29/668 |
| 11,592,837 B1* | 2/2023 | Potvin | G05D 1/0676 |
| 11,989,035 B2* | 5/2024 | Potvin | G05B 19/042 |
| 2002/0153452 A1 | 10/2002 | King et al. | |
| 2004/0093130 A1 | 5/2004 | Osder et al. | |
| 2010/0076625 A1 | 3/2010 | Yoeli | |
| 2011/0198440 A1 | 8/2011 | Saucray et al. | |
| 2013/0138270 A1 | 5/2013 | Christensen et al. | |
| 2019/0332125 A1 | 10/2019 | Irwin, III et al. | |
| 2020/0241567 A1 | 7/2020 | Zwiener et al. | |
| 2020/0269990 A1 | 8/2020 | Bevirt et al. | |
| 2020/0333805 A1 | 10/2020 | English et al. | |
| 2021/0139133 A1* | 5/2021 | Seeley | B64C 11/16 |
| 2022/0194557 A1 | 6/2022 | Thomas et al. | |
| 2022/0382300 A1* | 12/2022 | Larson | G01S 17/894 |
| 2023/0021800 A1 | 1/2023 | Britchford | |
| 2023/0168692 A1* | 6/2023 | Potvin | B64C 39/024 |
| | | | 701/16 |

OTHER PUBLICATIONS

Huang, Xianghua et al., "Synchrophasing Control In a Multi-Propeller Driven Aircraft", 2015 American Control Conference, Palmer House Hilton, Chicago, IL, USA, Jul. 1-3, 2015, pp. 1836-1841.

Walker, G., et al., "F-35B Integrated Flight-Propulsion Control Development", 2013 international powered lift conference, 2013, 15 pages.

Vigano, L., et al., "Development of augmented control laws for a tilt rotor in low and high speed flight modes", European Rotorcraft Forum, 2017, 14 pages.

Denham, J., et al., "Converging on a precision Hover control strategy for the F-35B Stovl aircraft.", AIAA Guidance, Navigation and Control Conference and Exhibit, 2006, 13 pages.

Whittle, R., "Flying The Osprey Is Not Dangerous, Just Different: Veteran Pilots", Breaking Defense, Sep. 5, 2012, 11 pages.

Kang, Y., et al., "Development of flight control system and troubleshooting on flight test of a tilt-rotor unmanned aerial vehicle", International Journal of Aeronautical and Space Sciences 17.1, 2016, p. 120-131, 12 pages.

International Search Report and Written Opinion of PCT application PCT/US2024/031454, dated Apr. 3, 2025, 10 pages.

\* cited by examiner

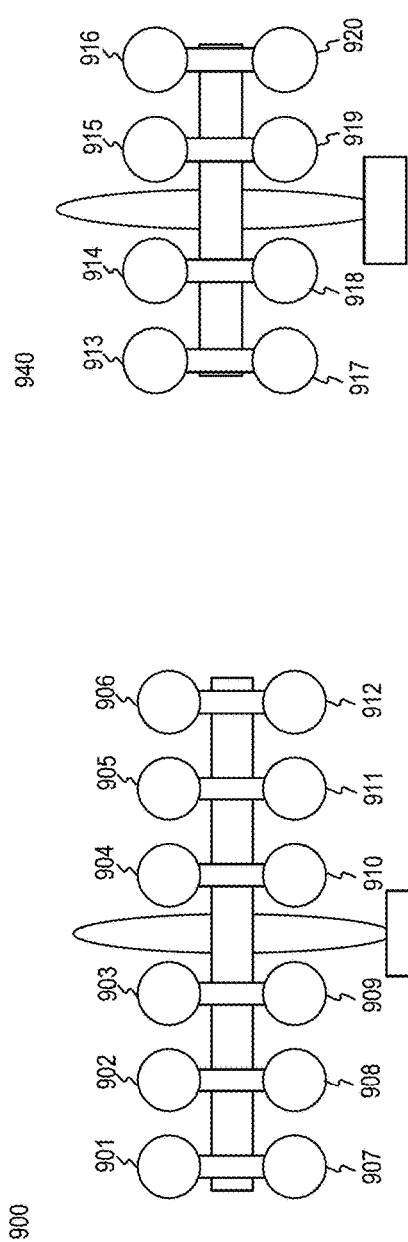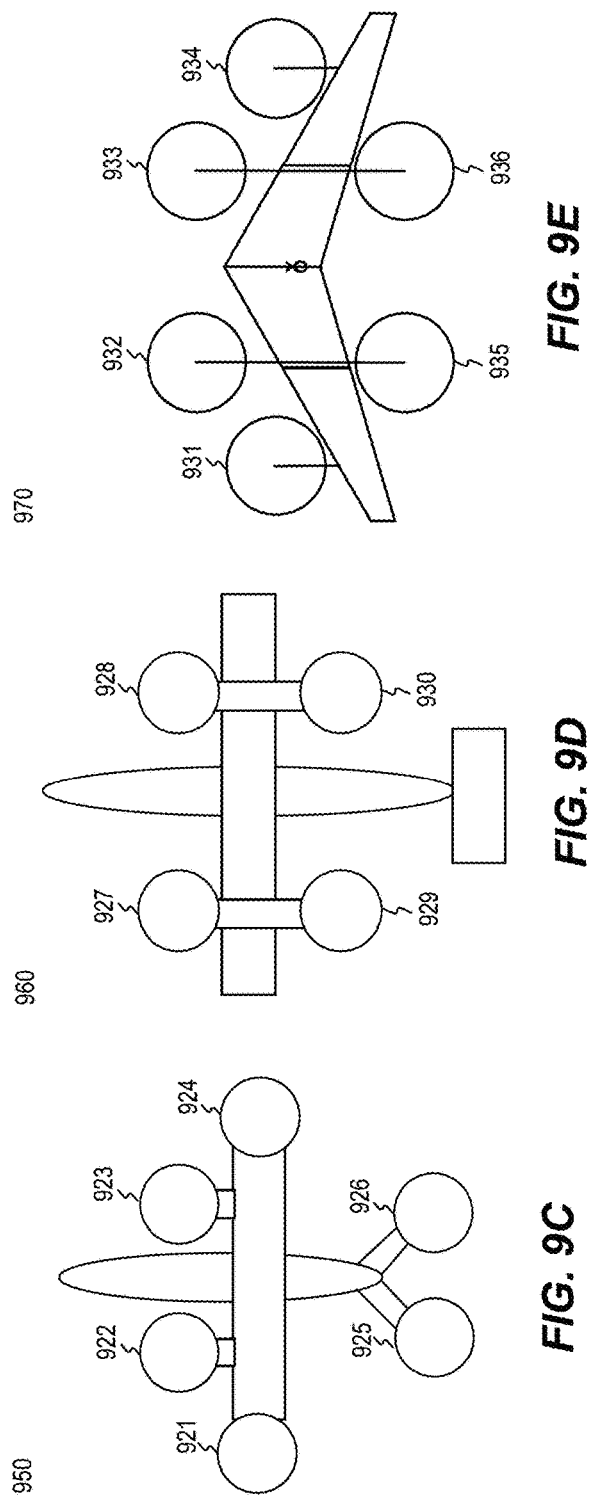

SYSTEMS AND METHODS FOR VIBRATION ATTENUATION IN FLIGHT CONTROL OF AN AIRCRAFT

PRIORITY CLAIM

This application is a continuation of, and claims priority to, PCT Application PCT/US24/31454, titled "SYSTEMS AND METHODS FOR VIBRATION ATTENUATION IN FLIGHT CONTROL OF AN AIRCRAFT", filed May 29, 2024, and U.S. Provisional Application No. 63/504,958, titled "SYSTEMS AND METHODS FOR FLIGHT CONTROL OF EVTOL AIRCRAFT," filed May 30, 2023, and U.S. Provisional Application No. 63/578,075, titled "SYSTEMS AND METHODS FOR FLIGHT CONTROL OF EVTOL AIRCRAFT", filed Aug. 22, 2023. The entire contents of the aforementioned applications are incorporated by reference herein for all purposes.

TECHNICAL FIELD

This disclosure relates generally to powered aerial vehicles. More particularly, and without limitation, the present disclosure relates to innovations in aircrafts driven by electric propulsion systems. Certain aspects of the present disclosure generally relate to systems and methods for flight control of aircrafts driven by electric propulsion systems and in other types of vehicles, as well as flight control of aircrafts in flight simulators and video games. Other aspects of the present disclosure generally relate to improvements in flight control systems and methods that provide particular advantages in aerial vehicles and may be used in other types of vehicles.

BACKGROUND

The inventors here have recognized several problems that may be associated with flight control of aircraft, including a tilt-rotor aircraft that uses electric or hybrid-electric propulsion systems (hereinafter referred to as electric propulsion units or "EPUs"). For example, aircraft propellers risk creating significant vibration in the aircraft when multiple propellers spin at the same speed (e.g., RPM). Further, each aircraft propeller may experience significant vibrations in certain speed ranges. These speed ranges where significant vibrations occur may vary based on the aircraft's airspeed and tilt angle of the propeller.

These vibrations may conduct through an engine and aircraft structure, to inertial measurement units (IMU) contained in onboard sensing equipment. Accordingly, the significant vibrations may corrupt the aircraft's state estimate based on IMU measurements, which may feed through the flight control system, resulting in high-frequency commands to flight elements (e.g., actuators, control surfaces, and engines). The high frequency commands may result in increased power consumption, increased temperatures, increased cycles and wear, and may contribute to increased cabin and community noise, as well as decreased ride quality.

Further, these vibrations may lead the electric engines to work inefficiently, may affect the controllability and stability of the aircraft, may increase the load on the aircraft structure, and may cause structural fatigue of different aircraft components. For example, propeller vibrations may impact an ability of the propeller to respond to flight control commands (e.g., a propeller torque and/or tilt angle), may cause a propeller angle to exceed a desired range of operation, and/or may strain or fracture aircraft components, such as a connection point between the propeller and the aircraft. A bending failure or other type of damage to the aircraft (potentially catastrophic damage) may result. The vibrations may also cause movement of the cabin and acoustic noise, decreasing ride quality for the aircraft's passengers.

This problem may be particularly significant in aircrafts with multiple propellers (e.g., a multi-rotor aircraft), a common configuration in many electric aircraft. The vibration of multiple propellers may magnify the impacts, especially when the propeller speeds of multiple propellers are the same. It may also be particularly difficult to detect which propeller(s) are causing vibrations and to control the aircraft to lessen the vibrations.

SUMMARY

The present disclosure relates generally to flight control of electric aircraft and other powered aerial vehicles. More particularly, and without limitation, the present disclosure relates to innovations in tilt-rotor aircraft that use electrical propulsion systems. Certain aspects of the present disclosure relate to controlling aircraft propeller speeds to avoid multiple propellers spinning at the same speed and increasing aircraft vibrations. Other aspects of the present disclosure relate to controlling each propeller to avoid certain speed ranges where vibrations are more significant. Further aspects of the present disclosure relate to performing the above propeller control while maintaining the required thrust necessary to respond to pilot commands.

One aspect of the present disclosure is directed to an electrical system for an aircraft, comprising: at least one processor configured to: receive pilot input indicating a commanded aircraft state, determine an aircraft thrust for achieving the commanded aircraft state, retrieve at least one propeller parameter associated with propeller speeds, wherein the propeller parameter is determined to reduce a structural vibratory response in the aircraft, determine a respective command for each propeller of the aircraft to achieve the determined aircraft thrust based on the at least one propeller parameter; and control each propeller of the aircraft based on the corresponding respective command.

Another aspect of the present disclosure is directed to an aircraft, including at least one processor configured to: receive pilot input indicating a commanded aircraft state, determine an aircraft thrust for achieving the commanded aircraft state, retrieve at least one propeller parameter associated with propeller speeds, wherein the propeller parameter is determined to reduce a structural vibratory response in the aircraft, determine a respective command for each propeller of the aircraft to achieve the determined aircraft thrust based on the at least one propeller parameter; and control each propeller of the aircraft based on the corresponding respective command.

Yet another aspect of the present disclosure is directed to a method for controlling an aircraft, comprising: receiving pilot input indicating a commanded aircraft state, determining an aircraft thrust for achieving the commanded aircraft state, retrieving at least one propeller parameter associated with propeller speeds, wherein the propeller parameter is determined to reduce a structural vibratory response in the aircraft, determining a respective command for each propeller of the aircraft to achieve the determined aircraft thrust based on the at least one propeller parameter; and controlling each propeller of the aircraft based on the corresponding respective command.

BRIEF DESCRIPTION OF THE DRAWINGS

FIGS. 9A, 9B, 9C, 9D, and 9E illustrate exemplary top plan views of VTOL aircraft, consistent with disclosed embodiments.

DETAILED DESCRIPTION

Figure 1:
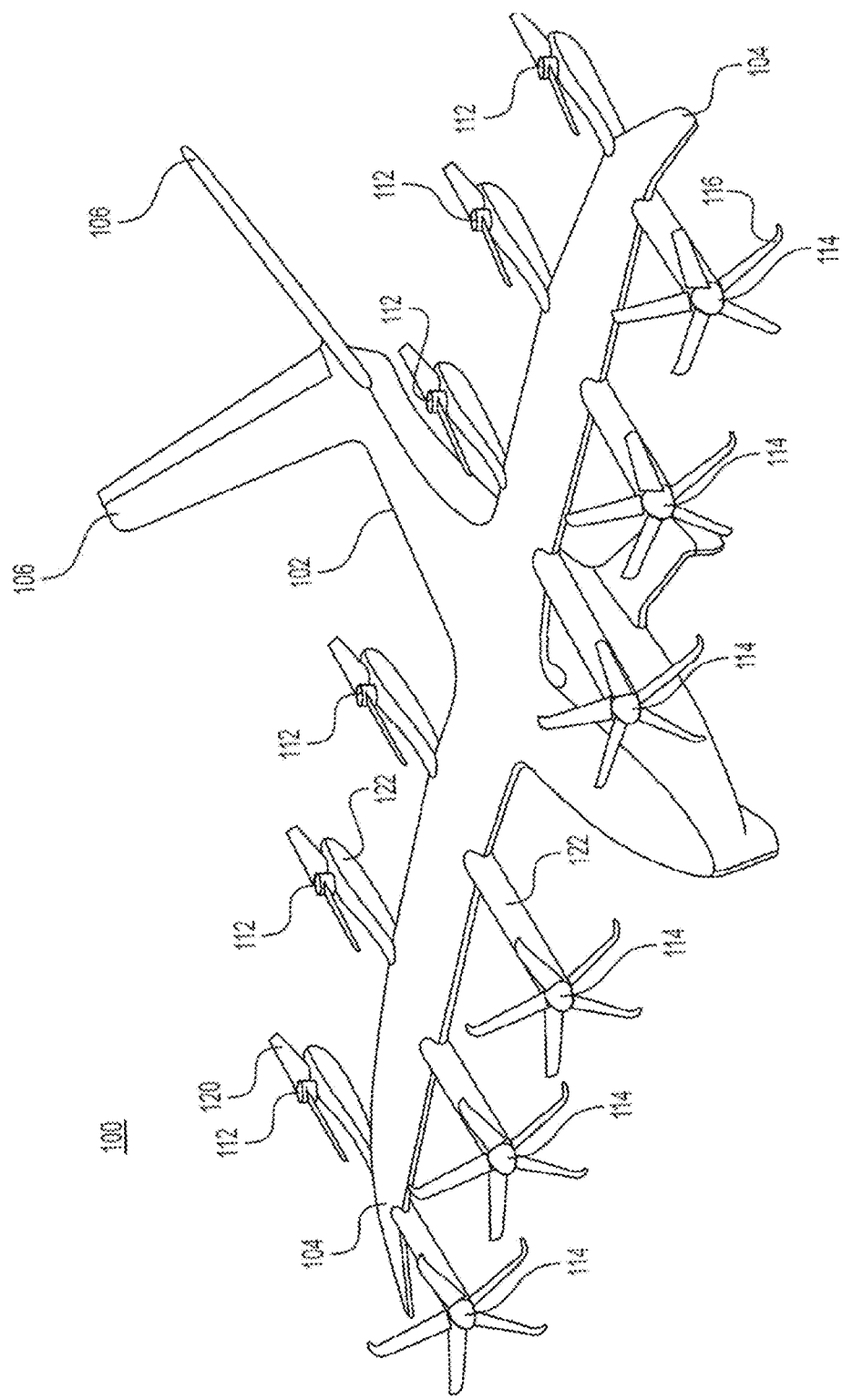
FIG. 1 shows an exemplary vertical takeoff and landing (VTOL) aircraft, consistent with disclosed embodiments.

The present disclosure addresses systems, components, and techniques primarily for use in an aircraft. The aircraft may be an aircraft with a pilot, an aircraft without a pilot (e.g., a UAV), a drone, a helicopter, and/or an airplane. An aircraft includes a physical body and one or more components (e.g., a wing, a tail, a propeller) configured to enable the aircraft to fly. The aircraft may include any configuration that includes at least one propeller. In some embodiments, the aircraft is driven by one or more electric propulsion systems (hereinafter referred to as electric propulsion units or "EPUs"). The aircraft may be fully electric, hybrid, or gas powered. For example, in some embodiments, the aircraft is a tilt-rotor aircraft configured for frequent (e.g., over 50 flights per work day), short-duration flights (e.g., less than 100 miles per flight) over, into, and out of densely populated regions. The aircraft may be configured to carry 4-6 passengers or commuters who have an expectation of a comfortable experience with low noise and low vibration. Accordingly, it is desirable to control the aircraft components in a manner that reduces aircraft vibration.

Disclosed embodiments provide new and improved configurations of aircraft components, some of which are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of components for an aircraft (e.g., electric aircraft or hybrid-electric aircraft) driven by a propulsion system.

In some embodiments, the aircraft driven by a propulsion system of the present disclosure may be designed to be capable of both vertical and conventional takeoff and landing, with a distributed propulsion system enabling vertical flight, horizontal and lateral flight, and transition (e.g., transitioning between vertical flight and horizontal flight). The aircraft may generate thrust by supplying high voltage electrical power to a plurality of engines of the distributed propulsion system, which may include components to convert the high voltage electrical power into mechanical shaft power to rotate a propeller.

Embodiments may include an electric engine connected to an onboard electrical power source, which may include a device capable of storing energy such as a battery or capacitor, and may optionally include one or more systems for harnessing or generating electricity such as a fuel powered generator or solar panel array. In some embodiments, the aircraft may comprise a hybrid aircraft using at least one of an electric-based energy source or a fuel-based energy source to power the distributed propulsion system. In some embodiments, the aircraft may be powered by one or more batteries, internal combustion engines (ICE), generators, turbine engines, or ducted fans.

The engines may be mounted directly to the wing, or mounted to one or more booms attached to the wing. The amount of thrust each engine generates may be governed by a torque command from a Flight Control System (FCS) over a digital communication interface to each engine. Embodiments may include forward engines (and associated propellers) that are capable of altering their orientation, or tilt.

The engines may rotate the propellers in a clockwise or counterclockwise direction. In some embodiments, the difference in propeller rotation direction may be achieved using the direction of engine rotation. In other embodiments, the engines may all rotate in the same direction, and gearing may be used to achieve different propeller rotation directions.

In some embodiments, an aircraft may possess quantities of engines in various combinations of forward and aft engine configurations. A forward engine may be considered an engine that is positioned predominantly towards the leading edge of a wing. An aft engine may be considered an engine that is positioned predominantly towards the trailing edge of a wing. For example, an aircraft may possess six forward and six aft engines, five forward and five aft engines, four forward and four aft engines, three forward and three aft engines, two forward and two aft engines, or any other combination of forward and aft engines, including embodiments where the number of forward engines and aft engines are not equivalent.

In some embodiments, for a vertical takeoff and landing (VTOL) mission, the forward and aft engines may provide vertical thrust during takeoff and landing. During flight phases where the aircraft is moving forward, the forward engines may provide horizontal thrust, while the propellers of the aft engines may be stowed at a fixed position in order to minimize drag. The aft engines may be actively stowed with position monitoring.

Transition from vertical flight to horizontal flight and vice-versa may be accomplished via the tilt propeller subsystem. The tilt propeller subsystem may redirect thrust between a primarily vertical direction during vertical flight phase (e.g., hover-phase) to a horizontal or near-horizontal direction during a forward-flight cruising phase, based on a tilt of one or more propellers (e.g., determining directionality of one or more propellers). A variable pitch mechanism may change the forward engine's propeller-hub assembly blade collective angles for operation during phases of flight, such as a hover-phase, transition phase, and cruise-phase. Vertical lift may be thrust in a primarily vertical direction (e.g., during a hover-phase). Horizontal thrust may be thrust in a primarily horizontal direction (e.g., during a cruise-phase).

In some embodiments, in a conventional takeoff and landing (CTOL) mission, the forward engines may provide horizontal thrust for wing-borne take-off, cruise, and landing, and the wings may provide vertical lift. In some embodiments, the aft engines may not be used for generating thrust during a CTOL mission and the aft propellers may be stowed in place. In other embodiments, the aft engines may be used at reduced power to shorten the length of the CTOL takeoff or landing.

As detailed above, embodiments of the aircraft may include many movable structural flight elements that allow pilots to safely control the aircraft. The rotation and orientation control of lift and tilt propellers provide the lift required for vertical take-off and landing, and hovering. Further, the rotation and orientation of the tilt propellers provide the forward thrust required to move the aircraft through the air. Therefore, the propellers are critical to the controllability, safety, and stability of the aircraft. One or more propellers experiencing significant vibrations could jeopardize the safety and stability of the aircraft, because the propellers may not respond as commanded. Further, the vibrations may cause measurement errors and lead to structural fatigue and damage of aircraft components.

The disclosed embodiments control the aircraft propellers to reduce a vibratory response in the aircraft and/or propellers. For example, the disclosed embodiments control the aircraft propellers to avoid multiple propellers spinning at the same speed, in lieu of existing control approaches which control multiple propellers to the same speed (resulting in increased vibrations). Further, the disclosed embodiments control the aircraft propellers to avoid certain speeds where vibrations are more significant, in lieu of existing control approaches which control propellers without regard to speed ranges that cause more significant vibrations (resulting in increased vibrations). The disclosed embodiments may avoid a vibratory response in the aircraft and/or propellers that is elevated (e.g., hazardous vibrations, undesirable vibrations, avoidable vibrations, vibrations exceeding a predetermined threshold).

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims.

Figure 2:
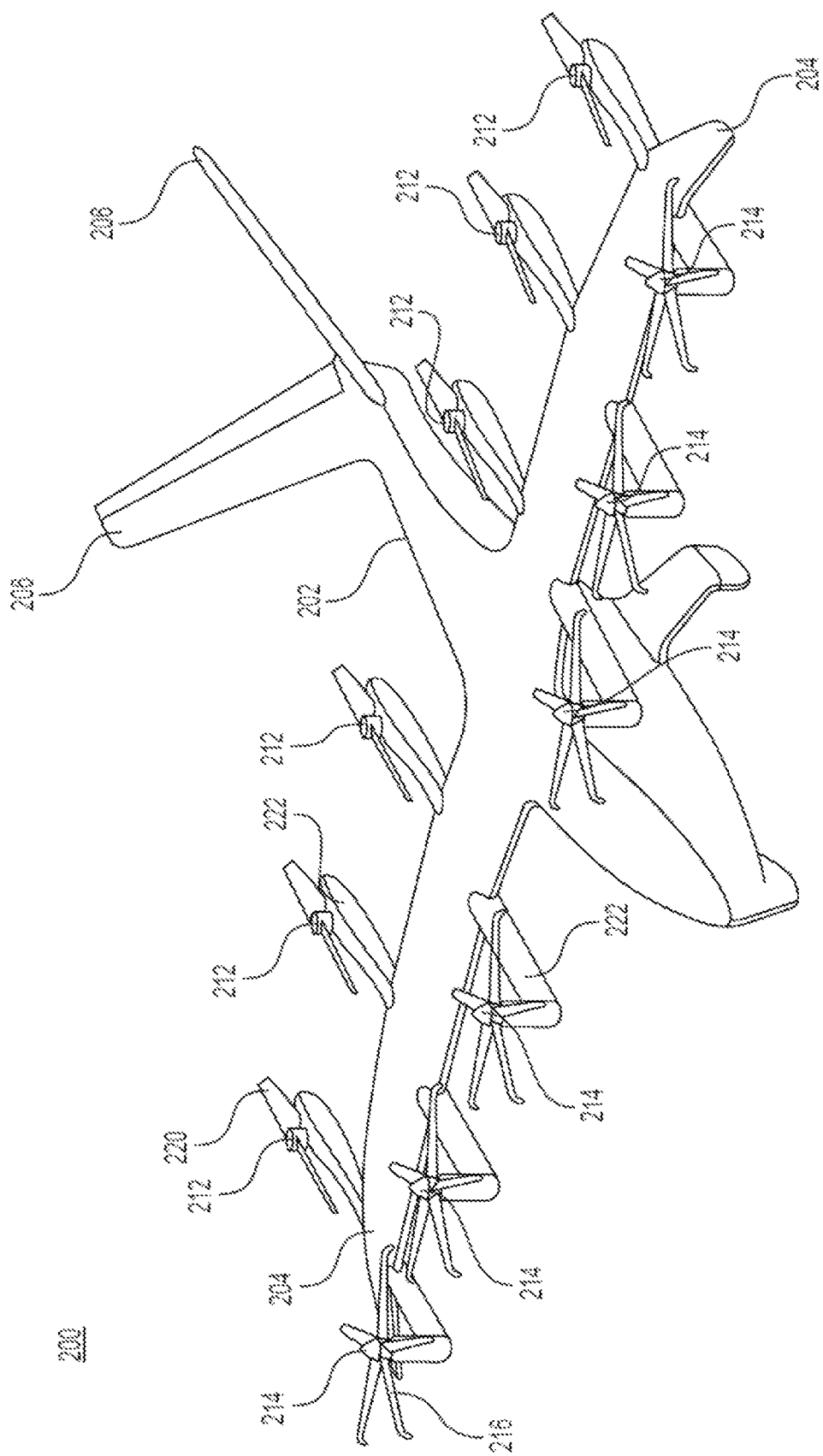
FIG. 2 shows an exemplary VTOL aircraft, consistent with disclosed embodiments.

FIG. 1 is an illustration of a perspective view of an exemplary VTOL aircraft, consistent with disclosed embodiments. FIG. 2 is another illustration of a perspective view of an exemplary VTOL aircraft in an alternative configuration, consistent with embodiments of the present disclosure. FIGS. 1 and 2 illustrate a VTOL aircraft 100, 200 in a cruise configuration and a vertical take-off, landing and hover configuration (also referred to herein as a "lift" configuration), respectively, consistent with embodiments of the present disclosure. Elements corresponding to FIGS. 1 and 2 may possess like numerals and refer to similar elements of aircrafts 100, 200. Aircraft 100, 200 may include a fuselage 102, 202, wings 104, 204 mounted to fuselage 102, 202 and one or more rear stabilizers 106, 206 mounted to the rear of the fuselage 102, 202. A plurality of lift propellers 112, 212 may be mounted to wings 104, 204 and may be configured to provide lift for vertical take-off, landing and hover. A plurality of tilt propellers 114, 214 may be mounted to wings 104, 204 and may be tiltable (e.g., configured to tilt or alter orientation) between the lift configuration in which they provide a portion of the lift required for vertical take-off, landing and hovering, as shown in FIG. 2, and the cruise configuration in which they provide forward thrust to aircraft 100 for horizontal flight, as shown in FIG. 1. As used herein, a tilt propeller lift configuration refers to any tilt propeller orientation in which the tilt propeller thrust is providing primarily lift to the aircraft and tilt propeller cruise configuration refers to any tilt propeller orientation in which the tilt propeller thrust is providing primarily forward thrust to the aircraft.

In some embodiments, lift propellers 112, 212 may be configured for providing lift only, with all horizontal propulsion being provided by the tilt propellers. For example, lift propellers 112, 212 may be configured with fixed positions and may only generate thrust during take-off, landing and hover phases of flight. Meanwhile, tilt propellers 114, 214 may be tilted upward into a lift configuration in which thrust from propellers 114, 214 is directed downward to provide additional lift.

For forward flight, tilt propellers 114, 214 may tilt from their lift configurations to their cruise configurations. In other words, the orientation of tilt propellers 114, 214 may be varied from an orientation in which the tilt propeller thrust is directed downward (to provide lift during vertical take-off, landing and hover) to an orientation in which the tilt propeller thrust is directed rearward (to provide forward thrust to aircraft 100, 200). The tilt propellers assembly for a particular electric engine may tilt about an axis of rotation defined by a mounting point connecting the boom and the electric engine. When aircraft 100, 200 is in full forward flight, lift may be provided entirely by wings 104, 204. Meanwhile, in the cruise configuration, lift propellers 112, 212 may be shut off. Blades 120, 220 of lift propellers 112, 212 may be held in low-drag positions for aircraft cruising. In some embodiments, lift propellers 112, 212 may each have two blades 120, 220 that may be locked, for example while the aircraft is cruising, in minimum drag positions in which one blade is directly in front of the other blade as illustrated in FIG. 1. In some embodiments, lift propellers 112, 212 have more than two blades. In some embodiments, tilt propellers 114, 214 may include more blades 116, 216 than lift propellers 112, 212. For example, as illustrated in FIGS. 1 and 2, lift propellers 112, 212 may each include, e.g., two blades, whereas and tilt propellers 114, 214 may each include more blades, such as the five blades shown. In some embodiments, each of tilt propellers 114, 214 may have 2 to 5 blades, and possibly more depending on the design considerations and requirements of the aircraft.

In some embodiments, the aircraft may include a single wing 104, 204 on each side of fuselage 102, 202 (or a single wing that extends across the entire aircraft). At least a portion of lift propellers 112, 212 may be located rearward of wings 104, 204 (e.g., rotation point of propeller is behind a wing from a bird's eye view) and at least a portion of tilt propellers 114, 214 may be located forward of wings 104, 204 (e.g., rotation point of propeller is in front of a wing from a bird's eye view). In some embodiments, all of lift propellers 112, 212 may be located rearward of wings 104, 204 and all of tilt propellers 114, 214 may be located forward of wings 104, 204. According to some embodiments, all lift propellers 112, 212 and tilt propellers 114, 214 may be mounted to the wings—i.e., no lift propellers or tilt propellers may be mounted to the fuselage. In some embodiments, lift propellers 112, 212 may be all located rearwardly of wings 104, 204 and tilt propellers 114, 214 may be all located forward of wings 104, 204. According to some embodiments, all lift propellers 112, 212 and tilt propellers 114, 214 may be positioned inwardly of the ends of the wing 104, 204.

In some embodiments, lift propellers 112, 212 and tilt propellers 114, 214 may be mounted to wings 104, 204 by booms 122, 222. Booms 122, 222 may be mounted beneath wings 104, 204, on top of the wings, and/or may be integrated into the wing profile. In some embodiments, lift propellers 112, 212 and tilt propellers 114, 214 may be mounted directly to wings 104, 204. In some embodiments, one lift propeller 112, 212 and one tilt propeller 114, 214 may be mounted to each boom 122, 222. Lift propeller 112, 212 may be mounted at a rear end of boom 122, 222 and tilt propeller 114, 214 may be mounted at a front end of boom 122, 222. In some embodiments, lift propeller 112, 212 may be mounted in a fixed position on boom 122, 222. In some embodiments, tilt propeller 114, 214 may mounted to a front end of boom 122, 222 via a hinge. Tilt propeller 114, 214 may be mounted to boom 122, 222 such that tilt propeller 114, 214 is aligned with the body of boom 122, 222 when in its cruise configuration, forming a continuous extension of the front end of boom 122, 222 that minimizes drag for forward flight.

In some embodiments, aircraft 100, 200 may include, e.g., one wing on each side of fuselage 102, 202 or a single wing that extends across the aircraft. According to some embodiments, the at least one wing 104, 204 is a high wing mounted to an upper side of fuselage 102, 202. According to some embodiments, the wings include control surfaces, such as flaps and/or ailerons. According to some embodiments, wings 104, 204 may have a profile that reduces drag during forward flight. In some embodiments, the wing tip profile may be curved and/or tapered to minimize drag.

In some embodiments, rear stabilizers 106, 206 include control surfaces, such as one or more rudders, one or more elevators, and/or one or more combined rudder-elevators. The wing(s) may have any suitable design for providing lift, directionality, stability, and/or any other characteristic beneficial for aircraft. In some embodiments, the wings have a tapering leading edge.

In some embodiments, lift propellers 112, 212 or tilt propellers 114, 214 may be canted relative to at least one other lift propeller 112, 212 or tilt propeller 114, 214, where canting refers to a relative orientation of the rotational axis of the lift propeller/tilt propeller about a line that is parallel to the forward-rearward direction, analogous to the roll degree of freedom of the aircraft.

In some embodiments, one or more lift propellers 112, 212 and/or tilt propellers 114, 214 may be canted relative to a cabin of the aircraft, such that the rotational axis of the propeller in a lift configuration is angled away from an axis perpendicular to the top surface of the aircraft. For example, in some embodiments, the aircraft is a flying wing aircraft as shown in FIG. 9E below, and some or all of the propellers are canted away from the cabin.

Figures 3, 4:
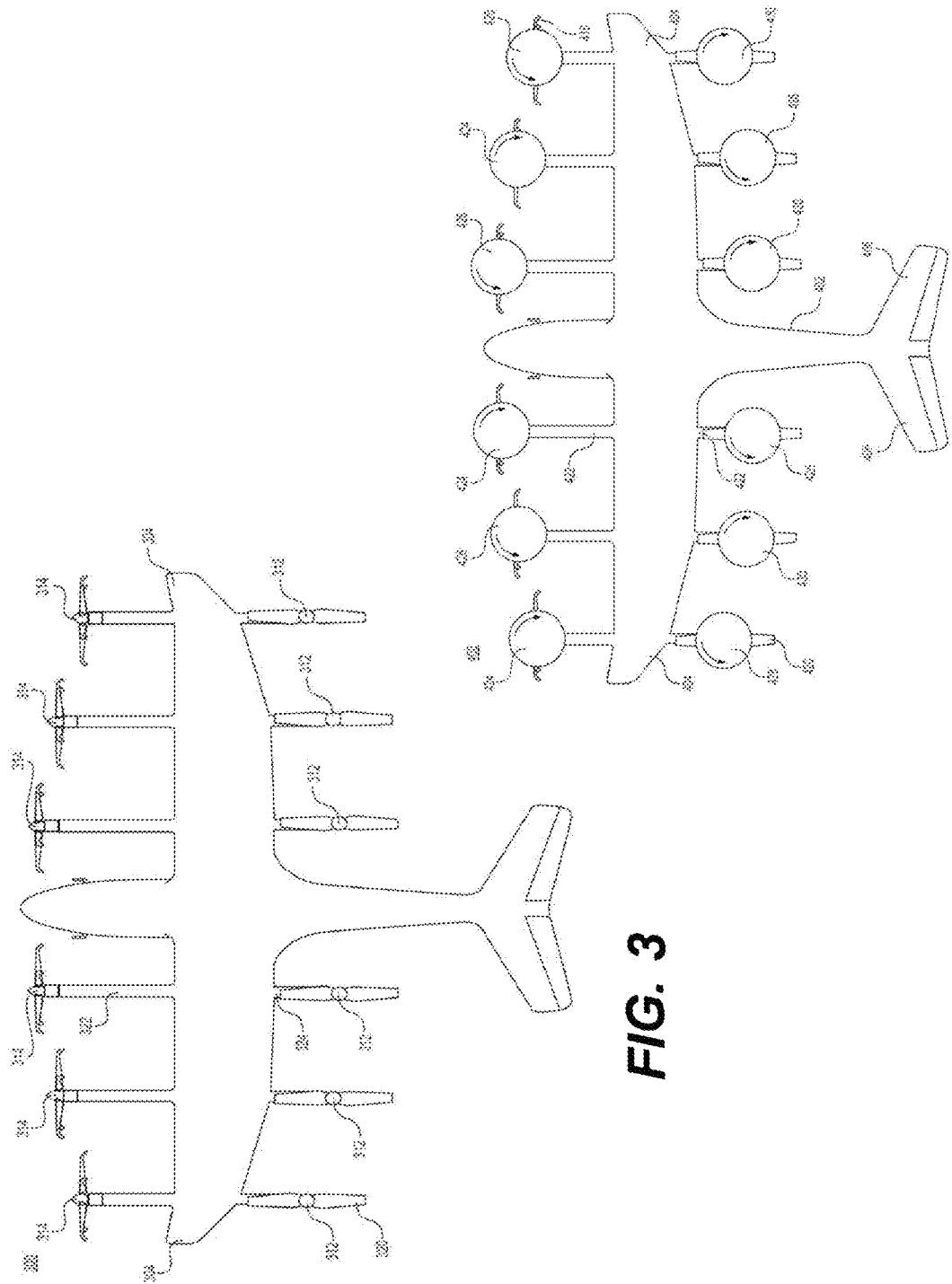
FIG. 3 shows an exemplary top plan view of a VTOL aircraft, consistent with disclosed embodiments.
FIG. 4 illustrates exemplary propeller rotation of a VTOL aircraft, consistent with disclosed embodiments.

FIG. 3 is an illustration of a top plan view of an exemplary VTOL aircraft, consistent with embodiments of the present disclosure. Aircraft 300 shown in the figure may be a top plan view of the aircraft 100, 200 shown in FIGS. 1 and 2, respectively. As discussed herein, an aircraft 300 may include twelve electric propulsion systems distributed across the aircraft 300. In some embodiments, a distribution of electric propulsion systems may include six forward electric propulsion systems 314 and six aft electric propulsion systems 312 mounted on booms forward and aft of main wings 304 of aircraft 300. In some embodiments, a length of the rear end of boom 324 from the wing 304 to a lift propeller (part of electric propulsion system 312) may comprise a similar rear end of boom 324 length across the numerous rear ends of the booms. In some embodiments, the length of the rear ends of the booms may vary, for example, across the six rear ends of the booms. Further, FIG. 3 depicts an exemplary embodiment of a VTOL aircraft 300 with forward propellers (part of electric propulsion system 314) in a horizontal orientation for horizontal flight and aft propeller blades 320 in a stowed position for a forward phase of flight.

FIG. 4 is a schematic diagram illustrating exemplary propeller rotation of a VTOL aircraft, consistent with disclosed embodiments. Aircraft 400 shown in the figure may be a top plan view of aircraft 100, 200, and 300 shown in FIGS. 1, 2, and 3, respectively. An aircraft 400 may include six forward electric propulsion systems with three of the forward electric propulsion systems being of clockwise (CW) type 424 and the remaining three forward electric propulsion systems being of counter-clockwise (CCW) type. In some embodiments, three aft electric propulsion systems may be of CCW type 428 with the remaining three aft electric propulsion systems being of CW type 430. Some embodiments may include an aircraft 400 possessing four forward electric propulsion systems and four aft electric propulsion systems, each with two CW types and two CCW types. In some embodiments, propellers may counter-rotate with respect to adjacent propellers to cancel torque steer, generated by the rotation of the propellers, experienced by the fuselage or wings of the aircraft. In some embodiments, the difference in rotation direction may be achieved using the direction of engine rotation. In other embodiments, the engines may all rotate in the same direction, and gearing may be used to achieve different propeller rotation directions.

Some embodiments may include an aircraft 400 possessing forward and aft electric propulsion systems where the amount of CW types 424 and CCW types 426 is not equal among the forward electric propulsion systems, among the aft electric propulsion systems, or among the forward and aft electric propulsion systems.

Figure 5:
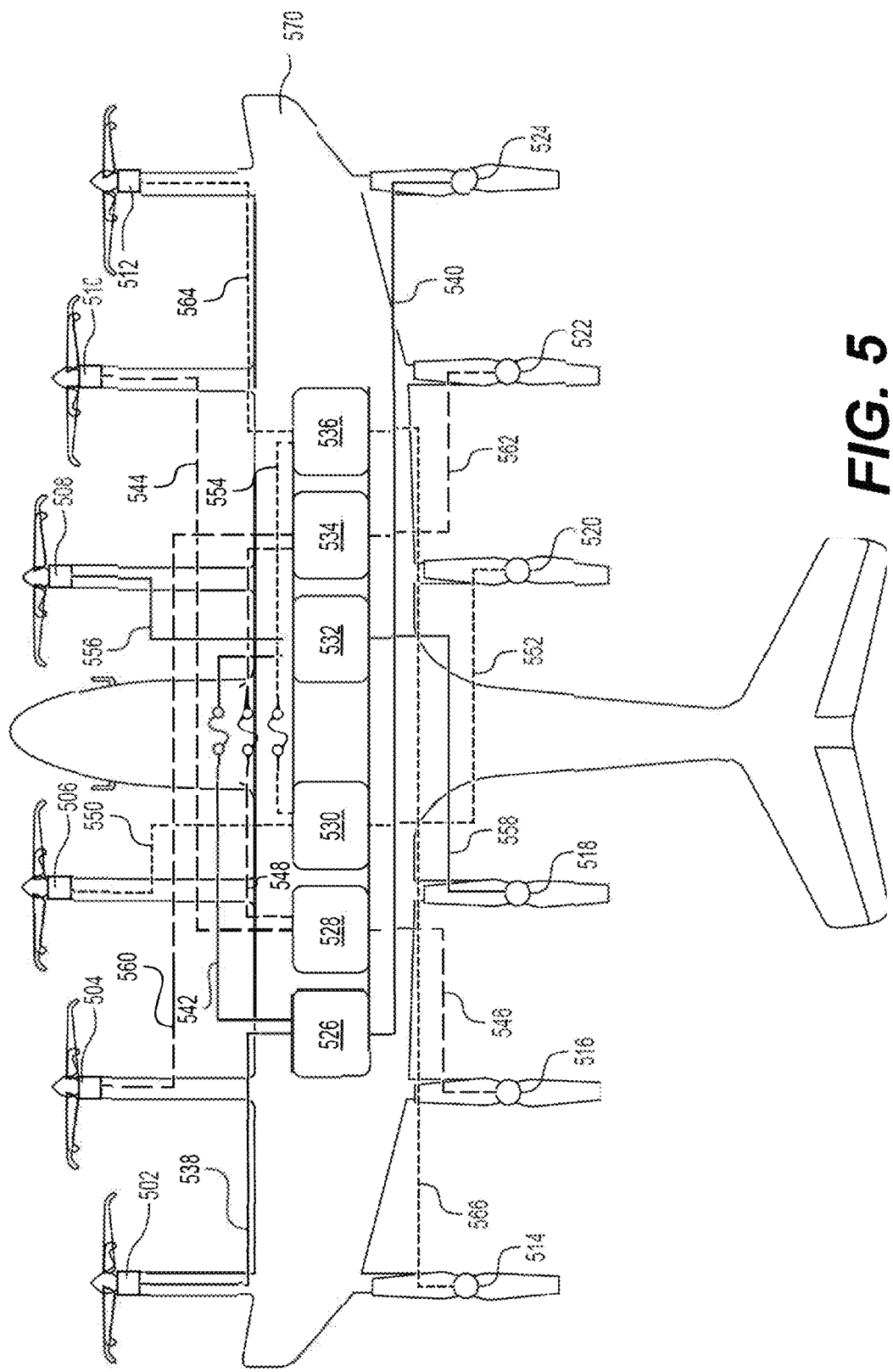
FIG. 5 shows exemplary power connections in a VTOL aircraft, consistent with disclosed embodiments.

FIG. 5 is a schematic diagram illustrating exemplary power connections in a VTOL aircraft, consistent with disclosed embodiments. A VTOL aircraft may have multiple power systems connected to diagonally opposing electric propulsion systems. In some embodiments, the power systems may include high voltage power systems. Some embodiments may include high voltage power systems connected to electric engines via high voltage channels. In some embodiments, an aircraft 500 may include six power systems (e.g., battery packs), including power systems (e.g., battery packs) 526, 528, 530, 532, 534, and 536 stored within wing 570 of aircraft 500. The power systems may power electric propulsion systems and/or other electric components of aircraft 500. In some embodiments, aircraft 500 may include six forward electric propulsion systems having six electric engines 502, 504, 506, 508, 510, and 512 and six aft electric propulsion systems having six electric engines 514, 516, 518, 520, 522, and 524. In some embodiments, one or more power systems (e.g., battery packs) may include a battery management system ("BMS") (e.g., one BMS for each battery pack). While six power systems are shown in FIG. 5, aircraft 500 may include any number and/or configuration of power systems.

Figure 6:
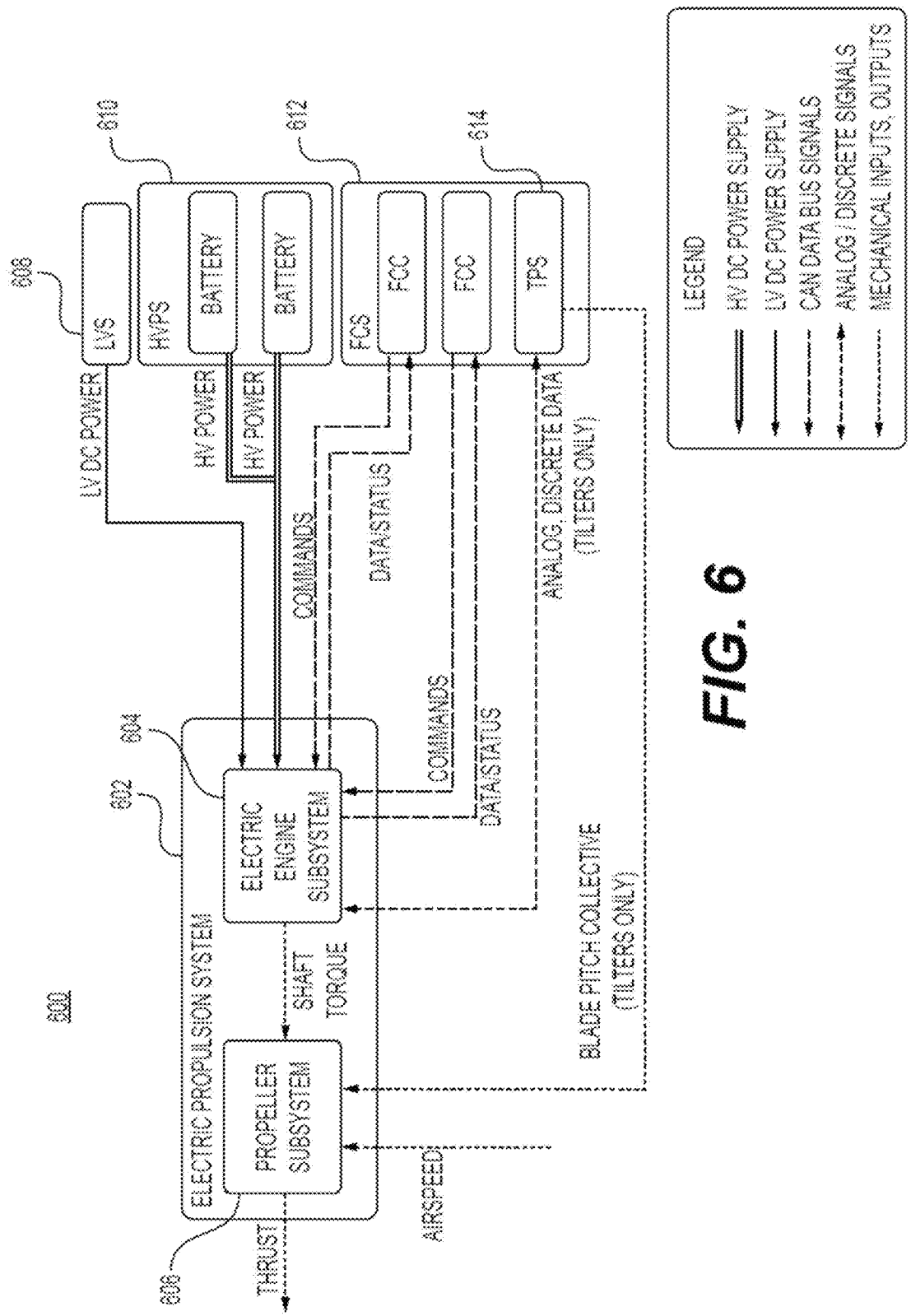
FIG. 6 is a schematic block diagram of an exemplary architecture and design of electric propulsion power and control system consistent with disclosed embodiments.

In some embodiments, the one or more battery management systems may communicate with a Flight Control System ("FCS") of the aircraft (e.g., FCS 612 shown in FIG. 6). For example, the FCS may monitor the status of one or more battery packs and/or provide commands to the one or more battery management systems which make corresponding adjustments to the high voltage power supply. As described above, high frequency commands may increase power consumption. In some embodiments, as shown in FIG. 5, this power consumption may drain battery packs connected to multiple electric engines. Therefore, there is a need to control the aircraft in a manner that avoids high frequency commands.

FIG. 6 is a schematic block diagram of an exemplary architecture and design of electric propulsion power and control system 600 consistent with disclosed embodiments. Electric propulsion power and control system 600 includes an electric propulsion system 602, which may be configured to control aircraft propellers. Electric propulsion system 602 may include an electric engine subsystem 604 that may supply torque, via a shaft, to a propeller subsystem 606 to produce the thrust of electric propulsion system 602. Some embodiments may include electric engine subsystem 604 receiving low voltage direct current (LV DC) power from a Low Voltage System (LVS) 608. In some embodiments, electric engine subsystem 604 may be configured to receive high voltage (HV) power from a High Voltage Power System (HVPS) 610 comprising at least one battery or other device capable of storing energy. HV power may refer to power that is lower in voltage than voltage provided by Low Voltage System (LVS) 608.

Some embodiments may include an electric propulsion system 602 including an electric engine subsystem 604 receiving signals from and sending signals to a flight control system 612. In some embodiments, a flight control system (FCS) 612 may comprise a flight control computer capable of using Controller Area Network ("CAN") data bus signals to send commands to the electric engine subsystem 604 and receive status and data from electric engine subsystem 604. It should be understood that while CAN data bus signals are used between the flight control computer and the electric engine(s), some embodiments may include any form of communication with the ability to send and receive data from a flight control computer to an electric engine. Some embodiments may include electric engine subsystems 604 capable of receiving operating parameters from and communicating operating parameters to an FCC in FCS 612, including speed, voltage, current, torque, temperature, vibration, propeller position, and/or any other value of operating parameters.

In some embodiments, a flight control system 612 may also include a Tilt Propeller System ("TPS") 614 capable of sending and receiving analog, discrete data to and from electric engine subsystem 604 of the tilt propellers. A tilt propeller system 614 may include an apparatus capable of communicating operating parameters to an electric engine subsystem 604 and articulating an orientation of propeller subsystem 606 to redirect the thrust of the tilt propellers during various phases of flight using mechanical means such as a gearbox assembly, linear actuators, and any other configuration of components to alter an orientation of propeller subsystem 606. In some embodiments, electric engine subsystem may communicate an orientation of the propeller system (e.g., an angle between lift and forward thrust) to TPS 614 and/or FCS 612 (e.g., during flight).

Figure 7:
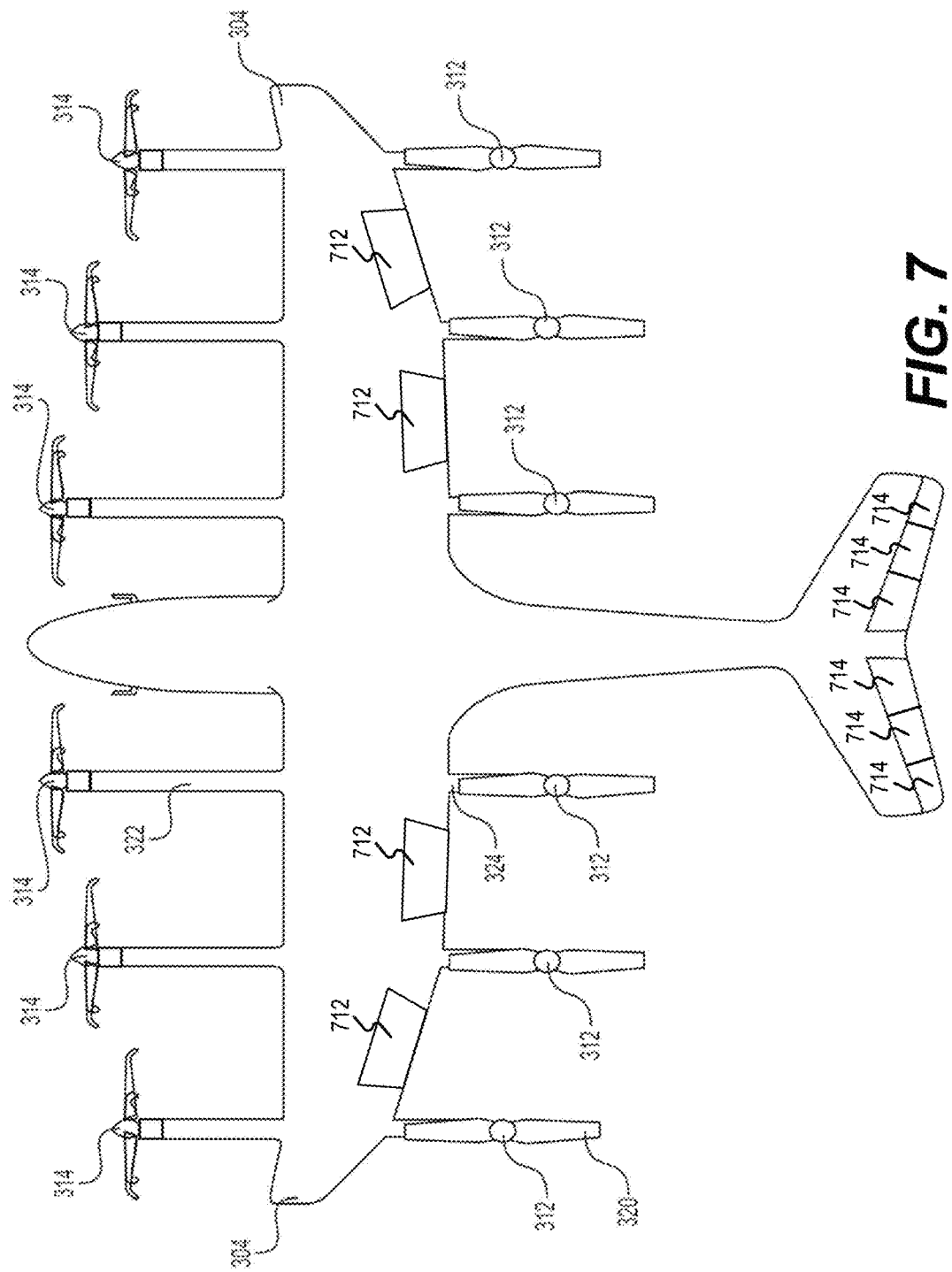
FIG. 7 shows an exemplary top plan view of a VTOL aircraft, consistent with disclosed embodiments.

In some embodiments, a flight control system may include a system capable of controlling control surfaces and their associated actuators in an exemplary VTOL aircraft. FIG. 7 is an illustration of a top plan view of an exemplary VTOL aircraft, consistent with embodiments of the present disclosure. Aircraft 700 shown in the figure may be a top plan view of the aircraft 100, 200 shown in FIGS. 1 and 2, respectively. In aircraft 700, the control surfaces may include, in addition to the propeller blades discussed earlier, flaperons 712 and ruddervators 714. Flaperons 712 may combine functions of one or more flaps, one or more ailerons, and/or one or more spoilers. Ruddervators 714 may combine functions of one or more rudders and/or one or more elevators. Additionally or alternatively, control surfaces may include separate rudders and elevators. In aircraft 700, the actuators may include, in addition to the electric propulsion systems discussed earlier, control surface actuators (CSAs) associated with flaperons 712 and ruddervators 714, as discussed further below with reference to FIG. 8.

Figure 8:
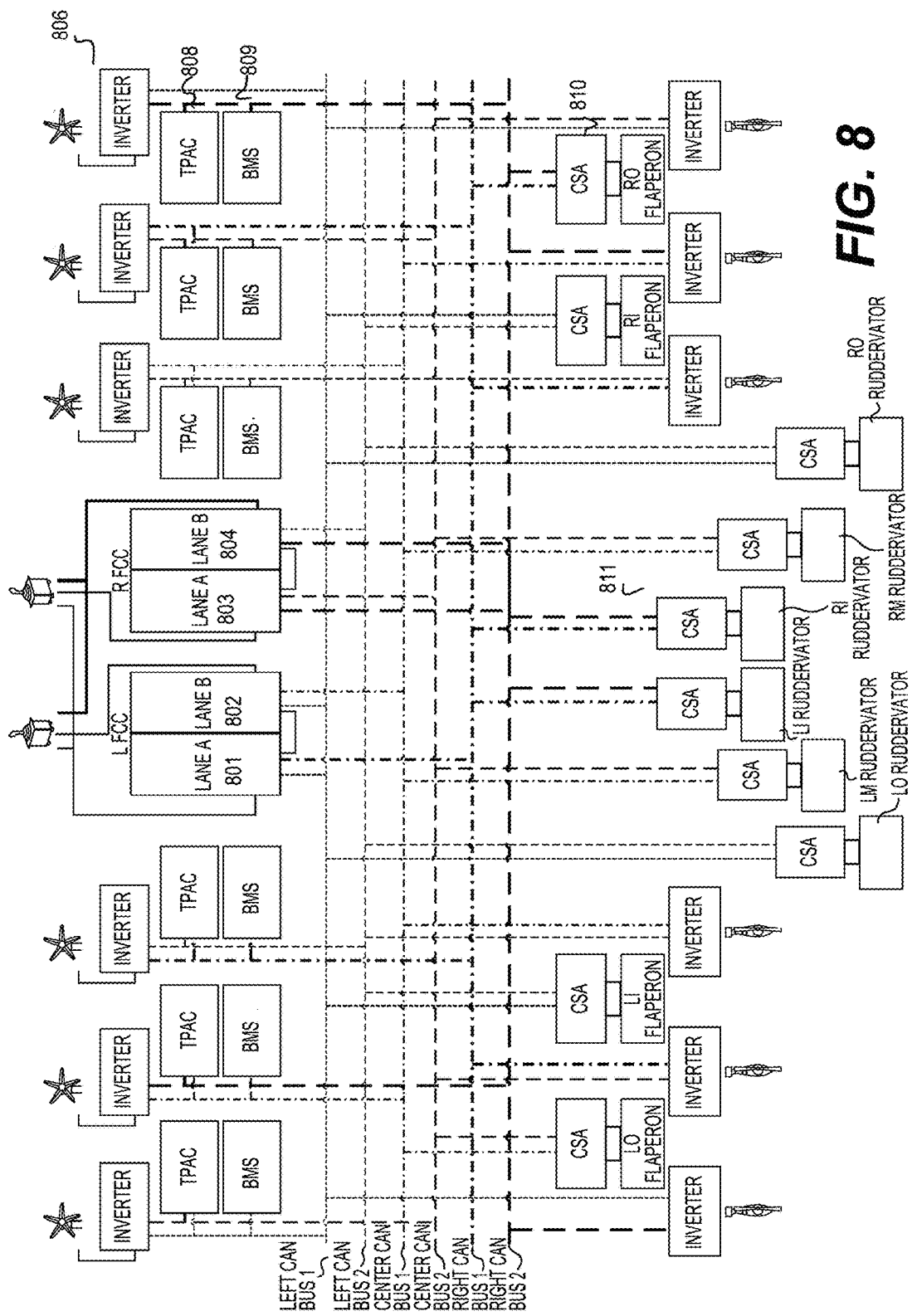
FIG. 8 is a schematic illustration of a flight control signaling architecture for controlling the control surfaces and associated actuators, consistent with disclosed embodiments.

FIG. 8 is a schematic illustration of a flight control signaling architecture 800 for controlling the control surfaces and associated actuators, consistent with disclosed embodiments. Although FIG. 7 illustrates twelve EPU inverters and associated propeller blades, six tilt propeller actuators (TPACs), six battery management systems (BMSs), four flaperons and associated control surface actuators (CSAs), and six ruddervators and associated CSAs, aircraft according to various embodiments can have any suitable number of these various elements. As shown in FIG. 8, control surfaces and actuators may be controlled by a combination of four flight control computers (FCCs)—Left FCC, Lane A (L FCC-A) 801, Left FCC, Lane B (L FCC-B) 802, Right FCC, Lane A (R FCC-A) 803, and Right FCC, Lane A (R FCC-B) 804, although any other suitable number of FCCs may be utilized. The FCCs may each individually control all control surfaces and actuators or may do so in any combination with each other. In some embodiments, each FCC may include one or more hardware computing processors. In some embodiments, each FCC may utilize a single-threaded computing process or a multi-threaded computing process to perform the computations required to control the control surfaces and actuators. In some embodiments, all computing processes required to control the control surfaces and actuators may be performed on a single computing thread by a single flight control computer.

The FCCs may provide control signals to the control surface actuators, including the EPU inverters 806, TPACs 808, BMSs 809, flaperon CSAs 810, and ruddervator CSAs 811, via one or more bus systems. For different control surface actuators, the FCC may provide control signals, such as voltage or current control signals, and control information may be encoded in the control signals in binary, digital, or analog form. In some embodiments, the bus systems may each be a CAN bus system, e.g., Left CAN bus 1, Left CAN bus 2, Right CAN bus 1, Right CAN bus 2, Center CAN bus 1, Center CAN bus 2 (see FIG. 8). In some embodiments, multiple FCCs may be configured to provide control signals via each CAN bus system, and each FCC may be configured to provide control signals via multiple CAN bus systems. In the exemplary architecture illustrated in FIG. 8, for example, L FCC-A may provide control signals via Left CAN bus 1 and Right CAN bus 1, L FCC-B may provide control signals via Left CAN bus 1 and Center CAN bus 1, R FCC-A may provide control signals via Center CAN bus 2 and Right CAN bus 2, and R FCC-B may provide control signals via Left CAN bus 2 and Right CAN bus 2.

FIGS. 9A-9E are illustrations of a top plan view of exemplary VTOL aircrafts, consistent with embodiments of the present disclosure. There may be a number of design considerations (cost, weight, size, performance capability etc.) that may influence the number and/or combination of tilt and lift propellers in a VTOL aircraft. As further described below, the number and orientation of propellers may affect propeller vibrations. Therefore, the flight control system may control the propellers in certain ways (e.g., those discussed in disclosed embodiments) to reduce a vibratory response in the aircraft.

FIG. 9A illustrates an arrangement of electric propulsion systems 900, consistent with embodiments of the present disclosure. Referring to FIG. 9A, the aircraft shown in the figure may be a top plan view of an exemplary aircraft (e.g., a VTOL aircraft). The aircraft may include twelve electric propulsion systems distributed across the aircraft. In some embodiments, a distribution of electric propulsion systems may include six forward electric propulsion systems 901, 902, 903, 904, 905, 906 and six aft electric propulsion systems 907, 908, 909, 910, 911, 912. In some embodiments, the six forward electric propulsion systems may be operatively connected to tilt propellers and the six aft electric propulsion systems may be operatively connected to lift propellers. In other embodiments, the six forward electric propulsion systems and a number of aft electric propulsion systems may be operatively connected to tilt propellers and the remaining aft electric propulsion systems may be operatively connected to lift propellers. In other embodiments, all forward and aft electric propulsion systems may be operatively coupled to tilt propellers.

FIG. 9B illustrates an alternate arrangement of electric propulsion systems 940, consistent with embodiments of the present disclosure. Referring to FIG. 9B, the aircraft shown in the figure may be a top plan view of an exemplary aircraft (e.g., a VTOL aircraft). The aircraft may include eight electric propulsion systems distributed across the aircraft. In some embodiments, a distribution of electric propulsion systems may include four forward electric propulsion systems 913, 914, 915, 916 and four aft electric propulsion systems 917, 918, 919, 920. In some embodiments, the four forward electric propulsion systems may be operatively connected to tilt propellers and the four aft electric propulsion systems may be operatively connected to lift propellers. In other embodiments, the four forward electric propulsion systems and a number of aft electric propulsion systems may be operatively connected to tilt propellers and the remaining aft electric propulsion systems may be operatively connected to lift propellers. In other embodiments, all forward and aft electric propulsion systems may be operatively coupled to tilt propellers.

FIG. 9C illustrates an alternate arrangement of electric propulsion systems 950, consistent with embodiments of the present disclosure. Referring to FIG. 9C, the aircraft shown in the figure may be a top plan view of an exemplary aircraft (e.g., a VTOL aircraft). The aircraft may include six electric propulsion systems distributed across the aircraft. In some embodiments, a distribution of electric propulsion systems may include a first set of four electric propulsion systems 921, 922, 923, 924 coplanar in a first plane and a second set of two electric propulsion systems 925, 926 coplanar in a second plane. In some embodiments, the first set of electric propulsion systems 921-924 may be operatively connected to tilt propellers and second set of electric propulsion systems 925, 926 may be operatively connected to lift propellers. In other embodiments, the first set of electric propulsion systems 921-924 and the second set of aft electric propulsion systems 925, 926 may all be operatively connected to tilt propellers.

FIG. 9D illustrates an alternate arrangement of electric propulsion systems 960, consistent with embodiments of the present disclosure. Referring to FIG. 9D, the aircraft shown in the figure may be a top plan view of an exemplary aircraft (e.g., a VTOL aircraft). The aircraft may include four electric propulsion systems distributed across the aircraft. In some embodiments, a distribution of electric propulsion systems may include four coplanar electric propulsion systems 927, 928, 929, 930. In some embodiments, all of the electric propulsion systems may be operatively connected to tilt propellers.

FIG. 9E illustrates an alternate arrangement of electric propulsion systems 970, consistent with embodiments of the present disclosure. Referring to FIG. 9E, the aircraft shown in the figure may be a top plan view of an exemplary aircraft (e.g., a VTOL aircraft). The aircraft may include six electric propulsion systems distributed across the aircraft. For example, in some embodiments, the aircraft may include four forward electric propulsion systems 931, 932, 933, 934 operatively connected to tilt propellers and the two aft electric propulsion systems 935 and 936 operatively connected to lift propellers. In some embodiments, the aircraft may include ten electric propulsion systems distributed across the aircraft. For example, in some embodiments, the aircraft may include six forward electric propulsion systems operatively connected to tilt propellers and the four aft electric propulsion systems operatively connected to lift propellers. In some embodiments, some or all of the aft electric propulsion systems may operatively connected to tilt propellers.

As shown in FIG. 9E, in some embodiments, the aircraft may have a flying wing configuration, such as a tailless fixed-wing aircraft with no definite fuselage. In some embodiments, the aircraft may have a flying wing configuration with the fuselage integrated into the wing. In some embodiments, the tilt propellers may rotate in a plane above the body of the aircraft when the tilt propellers operate in a lift configuration.

As disclosed herein, the forward electric propulsion systems and aft electric propulsion systems may be of a clockwise (CW) type or counterclockwise (CCW) type. Some embodiments may include various forward electric propulsion systems possessing a mixture of both CW and CCW types. In some embodiments, the aft electric propulsion systems may possess a mixture of CW and CCW type systems among the aft electric propulsion systems. In some embodiments, each electric propulsion systems may be fixed as clockwise (CW) type or counterclockwise (CCW) type, while in other embodiments, one or more electric propulsion systems may vary between clockwise (CW) and counterclockwise (CCW) rotation.

Figure 10:
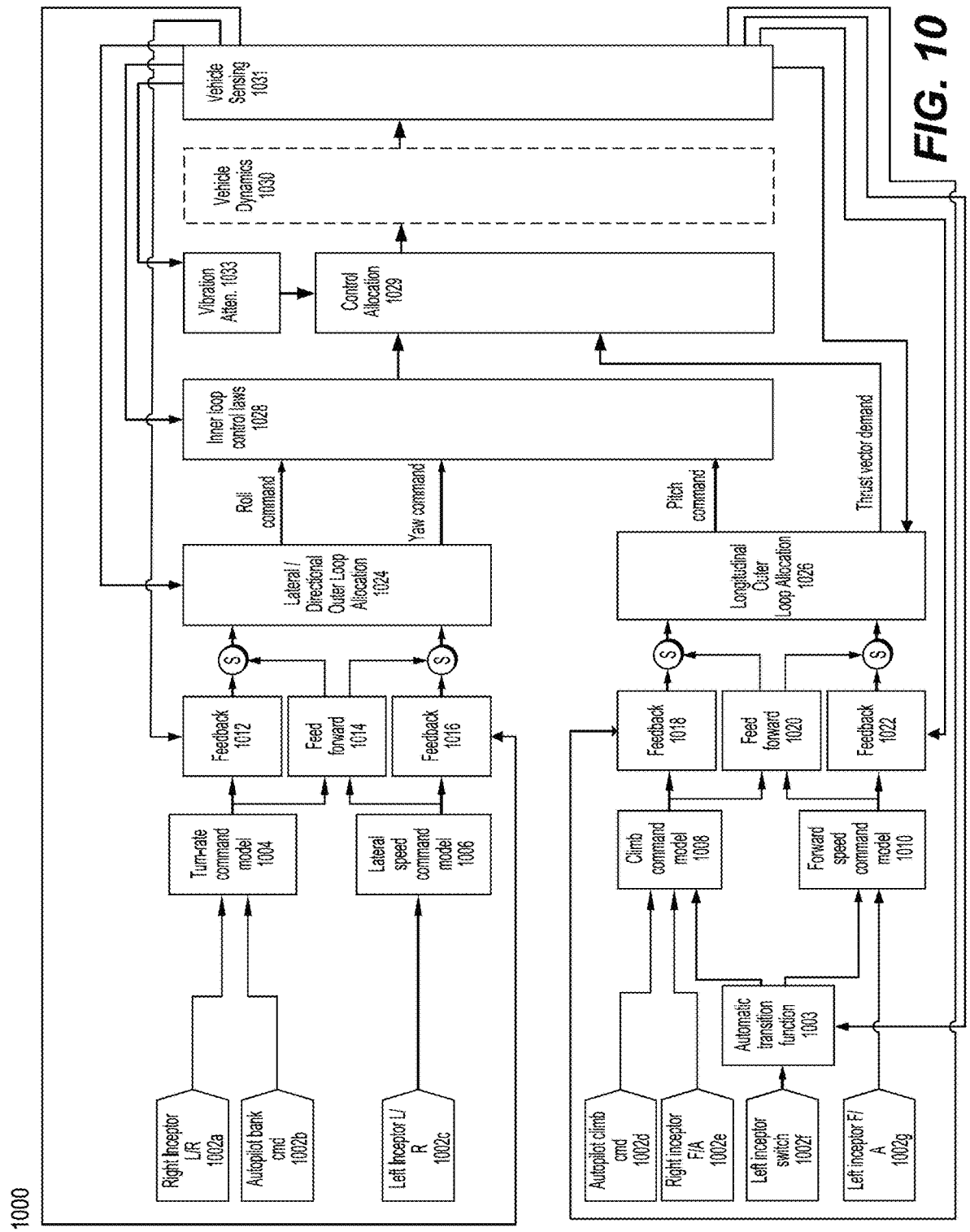
FIG. 10 illustrates a functional block diagram of an exemplary control system of an electric VTOL aircraft, consistent with disclosed embodiments.

FIG. 10 illustrates a functional block diagram of an exemplary control system 1000 of an aircraft, consistent with disclosed embodiments. System 1000 may be implemented by at least one processor (e.g., at least one microprocessor-based controller) configured to execute software code stored in a storage medium (e.g., a computer-readable medium, a non-transitory computer-readable medium) to implement the functions described herein. System 1000 may also be implemented in hardware, or a combination of hardware and software. System 1000 may be implemented as part of a flight control system of the aircraft (e.g., part of FCS 612 in FIG. 6) and may be configured to perform a single step or sequence repeatedly until a desired or commanded outcome is achieved. It is to be understood that many of conventional functions of the control system are not shown in FIG. 10 for ease of description. System 1000 further includes one or more storage mediums storing model(s), function(s), table(s), and/or any information for executing the disclosed processes. As further described below, any or each box indicating a command model 1004, 1006, 1008, 1010, feedback 1012, 1016, 1018, 1022, feed forward 1014, 1020, outer loop allocation 1024, 1026, inner loop control laws 1028, control allocation 1029, and Vibration Attenuation 1033 may represent or include module(s), script(s), function(s), application(s), and/or program(s) that are executed by processor(s) and/or microprocessor(s) of the System 1000. It is appreciated that the complexity and interconnectedness of the functional block diagram of FIG. 10 would be impossible, or at least impractical, to effectively implement by a human user, especially when considering that these functionalities are implemented while the aircraft is flying (including taking off or landing).

System 1000 may detect one or more inputs, such as from a pilot input device configured to receive at least one pilot input and generate or influence a signal. A pilot input may be generated by and/or received from an input device or mechanism of the aircraft, such as a button, a switch, a stick, a slider, an inceptor, or any other device configured to generate or influence a signal based on a physical action from a pilot. For example, a pilot input device may include one or more of right inceptor(s) (e.g., moving left/right 1002a and/or forward/aft 1002e), left inceptor(s) (e.g., moving left/right 1002c and/or forward/aft 1002g), and/or left inceptor switch 1002f. In some embodiments, a pilot input device may include an interface with an autopilot system (e.g., display screen(s), switch(es), button(s), lever(s), and/or other interface(s)). Optionally, system 1000 may further detect inputs from an autopilot system, such as autopilot roll command 1002b, autopilot climb command 1002d, and/or other command(s) to control the aircraft.

In some embodiments, the one or more inputs may include at least one of a position and/or rate of a right inceptor and/or a left inceptor, signals received (e.g., response type change commands, trim inputs, backup control inputs, etc.) from switches on the inceptors, measurements of aircraft state and environmental conditions (e.g., measured load factor, airspeed, roll angle, pitch angle, actuator states, battery states, aerodynamic parameters, temperature, gusts, etc.) based on data received from one or more sensors of the aircraft, obstacles (e.g., presence or absence of other aircraft and/or debris), and an aircraft mode (e.g., taxiing on the ground, takeoff, in-air). For example, right inceptor L/R 1002a may comprise a lateral position and/or rate of a right inceptor (e.g., an inceptor positioned to the right of another inceptor and/or an inceptor positioned on the right side of a pilot area), autopilot roll cmd 1002b may comprise a roll signal received in autopilot mode, left inceptor L/R 1002c may comprise a lateral position and/or rate of a left inceptor (e.g., an inceptor positioned to the left of another inceptor and/or an inceptor positioned on the left side of a pilot area), autopilot climb cmd 1002d may comprise a climb signal received in autopilot mode, right inceptor F/A 1002e may comprise a longitudinal position and/or rate of the right inceptor, left inceptor switch 1002f may comprise a signal from a switch for enabling or disabling automatic transition function 1003, and left inceptor F/A 1002g may comprise a longitudinal position and/or rate of the left inceptor.

Each input may include additional data as listed above (e.g., signals from switches, measurements of aircraft state, aircraft mode, etc.). Actuator states may include actuator hardware limits, such as travel limits, speed limits, response time limits, etc., and can include actuator health indicators that may indicate deteriorations in actuator performance that may limit a given actuator's ability to satisfy actuator commands. Actuator states may be used to determine the bounds (e.g., minimum/maximum values) for individual actuator commands. Battery states may correspond to remaining energy of the battery packs of the aircraft, which may be monitored when control allocation 1029 considers balancing battery pack energy states. Aerodynamic parameters may be parameters derived from aerodynamic and acoustic modeling and can be based on the actuator Jacobian matrices and actuator states. Each input received from an inceptor may indicate a corresponding adjustment to an aircraft's heading or power output.

Command models 1004, 1006, 1008, 1010 may be configured to determine a shape (e.g., aggressiveness, slew rate, damping, overshoot, etc.) of an ideal aircraft response. For example, each command model of command models 1004, 1006, 1008, 1010 may be configured to receive and interpret at least one of inputs 1002a, 1002b, 1002c, 1002d, 1002e, 1002f, 1002g and, in response, compute a corresponding change to an aircraft's orientation, heading, and propulsion, or a combination thereof using an integrator (not pictured). In some embodiments, right inceptor L/R 1002a and autopilot roll cmd 1002b may be fed into turn-rate command model 1004, left inceptor L/R 1002c may be fed into lateral speed command model 1006, autopilot climb cmd 1002d and right inceptor F/A 1002e may be fed into climb command model 1008, and left inceptor F/A 1002g may be fed into forward speed command model 1010. In some embodiments, an output from automatic transition function 1003 may be fed into at least one of climb command model 1008 or forward speed command model 1010. For example, based on receiving an enable signal from left inceptor switch 1002f, automatic transition function 1003 may automatically determine at least one of a climb signal or a forward speed signal for transmission to at least one of climb command model 1008 or forward speed command model 1010.

Turn-rate command model 1004 may be configured to output a desired position and/or turn-rate command and may also be configured to compute a desired heading of the aircraft to be assumed when the inceptor is brought back to a centered position (i.e., in detent). Lateral speed command model 1006 may be configured to output a desired position and/or lateral speed command. Climb command model 1008 may be configured to output at least one of a desired altitude, vertical speed, or vertical acceleration command. Forward speed command model 1010 may be configured to output at least one of a desired position, longitudinal speed, or longitudinal acceleration command. In some embodiments, one or more of the command models may be configured to output an acceleration generated in response to changes in speed command. For example, climb command model 1008 may be configured to output a vertical acceleration generated in response to a change in vertical speed command.

Feed forward 1014 and 1020 may each receive as input one or more desired changes (e.g., desired position, speed and/or acceleration) from corresponding command models 1004, 1006, 1008, 1010 as well as data received from the one or more aircraft sensors (e.g., airspeed, vehicle orientation, vehicle load factor, measured acceleration, vehicle mass and inertia, air density, altitude, aircraft mode, etc.) and may be configured to output, for each desired change, a corresponding force to accomplish the desired change. In some embodiments, feed forward 1014, 1020 may be configured to determine the corresponding force using simplified models of aircraft dynamics. For example, based on a known (e.g., a stored value of) or determined mass of the aircraft, feed forward 1014, 1020 may be configured to determine a force to cause the aircraft to follow a desired acceleration command. In some embodiments, feed forward 1014, 1020 may be configured to use a model predicting an amount of drag on the vehicle produced as a function of speed in order to determine a force required to follow a desired speed command signal.

Feedback 1012, 1016, 1018, 1022 may each receive as input the one or more desired changes (e.g., desired position, speed and/or acceleration) from command models 1004, 1006, 1008, 1010 as well as data received from Vehicle Sensing 1031 indicating vehicle dynamics 1030. For example, sensed vehicle dynamics 1030 may comprise the physics and/or natural dynamics of the aircraft, and Vehicle Dynamics Sensing 1031 sensor measurements may capture how the aircraft moves in response to pilot inputs, propulsion system outputs or ambient conditions. Additionally or alternatively, data received from Vehicle Sensing 1031 may include error signals generated, by one or more processors, based on exogenous disturbances (e.g., gust causing speed disturbance). In some embodiments, feedback 1012, 1016, 1018, 1022 may be configured to generate feedback forces (e.g., at an actuator) based on the received error signals. For example, feedback 1012, 1016, 1018, 1022 may generate feedback forces with the intent of counteracting the effect(s) of external disturbances. Additionally or alternatively, feedback 1012, 1016, 1018, 1022 may be configured to generate feedback forces based on modeling errors. For example, if an incorrect aircraft mass is input into either feed forward 1014 or 1020, the aircraft may accelerate faster or slower than the desired change. Based on determining a difference between the desired acceleration and the measured acceleration, one or more processors (e.g., included in vehicle sensing 1031) may generate an error signal which may be looped into feedback 1012, 1016, 1018 or 1022 to determine an additional force needed to correct the error.

In some embodiments, feedback 1012, 1016, 1018, 1022 may be disabled. For example, in response to losing position and/or ground speed feedback due to disruption of global position system (GPS) communication, system 1000 may be configured to operate without feedback 1012, 1016, 1018, 1022 until GPS communication is reconnected.

In some embodiments, feedback 1012, 1016, 1018, 1022 may receive as input a plurality of measurements as well as a trust value for each measurement indicating whether the measurement is valid. For example, one or more processors of system 1000 may assign a Boolean (true/false) value for each measurement used in system 1000 to indicate that the measurement is trustworthy (e.g., yes) or that the measurement may be invalid (e.g., no). Based on one or more processors identifying a measurement as invalid, feedback 1012, 1016, 1018, 1022 may omit that measurement for further processing. For example, in response to one or more processors identifying a heading measurement as invalid, feedback 1012, 1016, 1018, 1022 may omit subsequent heading measurements in determining feedback force(s).

In some embodiments, feedback 1012, 1016, 1018, 1022 may determine one or more feedback forces based on actuator state information received from one or more sensors (e.g., included in vehicle sensing 1031). For example, in response to actuator state information indicating that there is a failure of an actuator, one or more processors of system 1000 may update one or more processes of system 1000 and determine an alternative command to achieve the desired change. For example, one or more processors of system 1000 may adjust one or more model(s), function(s), algorithm(s), table(s), input(s), parameter(s), threshold(s), and/or constraint(s) in response to the failure of an actuator. Alternative command(s) (e.g., yaw, pitch, roll, thrust, or torque) may be determined based on the adjustment(s). Additionally or alternatively, in response to actuator state information indicating that one or more actuators are at a maximum value, one or more processors of system 1000 may update one or more processes of system 1000 (e.g., as described above) and determine an alternative command to achieve the desired change.

Total desired forces may be calculated based on outputs of feedback 1012, 1016, 1018, 1022 and feed forward 1014, 1020. For example, one or more processors of system 1000 may calculate a desired turn-rate force by summing the outputs of feedback 1012 and feed forward 1014. Additionally or alternatively, one or more processors of system 1000 may calculate a desired lateral force by summing the outputs of feedback 1016 and feed forward 1014. Additionally or alternatively, one or more processors of system 1000 may calculate a desired vertical force by summing the outputs of feedback 1018 and feed forward 1020. Additionally or alternatively, one or more processors of system 1000 may calculate a desired longitudinal force by summing the outputs of feedback 1022 and feed forward 1020.

Lateral/Directional Outer Loop Allocation 1024 and Longitudinal Outer Loop Allocation 1026 may each be configured to receive as input one or more desired forces and data received from the one or more aircraft sensors (e.g., airspeed, vehicle orientation, vehicle load factor, measured acceleration, vehicle mass and inertia, indications of working/failed actuators, air density, altitude, aircraft mode, whether the aircraft is in the air or on ground (e.g., weight on wheels etc.). Based on the inputs, Outer Loop Allocations 1024 and 1026 may be configured to command roll, command yaw, command pitch, demand thrust, or output a combination of different commands/demands in order to achieve the one or more desired forces.

Lateral/Directional Outer Loop Allocation 1024 may receive as input a desired turn-rate force and/or a desired lateral force and may command roll or command yaw. In some embodiments, Lateral/Directional Outer Loop Allocation 1024 may determine output based on a determined flight mode. A flight mode may be determined using pilot inputs (e.g., a selected mode on an inceptor) and/or sensed aircraft information (e.g., an airspeed). For example, Lateral/Directional Outer Loop Allocation 1024 may determine a flight mode of the aircraft using at least one of a determined (e.g., sensed or measured) airspeed or an input received at a pilot inceptor button (e.g., an input instructing the aircraft to fly according to a particular flight mode). In some embodiments, Lateral/Directional Outer Loop Allocation 1024 may be configured to prioritize a pilot inceptor button input over measured airspeed in determining the flight mode (e.g., the pilot inceptor button is associated with a stronger weight or higher priority than a measured airspeed). In some embodiments, Lateral/Directional Outer Loop Allocation 1024 may be configured to blend (e.g., using weighted summation) the determined airspeed and pilot inceptor button input to determine the flight mode of the aircraft. In a hover flight mode, Lateral/Directional Outer Loop Allocation 1024 may achieve the desired lateral force with a roll command (e.g., roll angle, roll rate) and may achieve the desired turn-rate force with a yaw command. In some embodiments, such as in hover flight mode, the aircraft may be configured to not be able to accelerate outside a predetermined hover envelope (i.e., hover speed range). In a forward-flight mode (e.g., horizontal flight), Lateral/Directional Outer Loop Allocation 1024 may achieve the desired lateral force with a yaw command and may achieve the desired turn-rate force with a roll command. In forward flight mode, Lateral/Directional Outer Loop Allocation 1024 may be configured to determine output based on sensed airspeed. In a transition between hover flight mode and forward flight mode, Lateral/Directional Outer Loop Allocation 1024 may achieve desired forces using a combination of a roll command and a yaw command.

Longitudinal Outer Loop Allocation 1026 may receive as input a desired vertical force and/or a desired longitudinal force and may output at least one of a pitch command (i.e., pitch angle) or a thrust vector demand. A thrust vector demand may include longitudinal thrust (i.e., mix of nacelle tilt and front propeller thrust) and vertical thrust (i.e., combined front and rear thrust). In some embodiments, Longitudinal Outer Loop Allocation 1026 may determine output based on a determined flight mode. For example, in a hover flight mode, Longitudinal Outer Loop Allocation 1026 may achieve a desired longitudinal force by lowering a pitch attitude and by using longitudinal thrust, and may achieve a desired vertical force with vertical thrust. In a forward-flight mode, Longitudinal Outer Loop Allocation 1026 may achieve a desired longitudinal force with longitudinal thrust (e.g., front propeller thrust). In a cruise flight mode, longitudinal section 1026 may achieve a desired vertical force by commanding pitch (e.g., raising pitch attitude) and demanding thrust (e.g., increasing longitudinal thrust).

Inner loop control laws 1028 may be configured to determine moment commands based on at least one of a roll command, yaw command, or pitch command from Lateral/Directional Outer Loop Allocation 1024 or Longitudinal Outer Loop Allocation 1026. In some embodiments, Inner loop control laws 1028 may be dependent on sensed vehicle dynamics (e.g., from Vehicle Sensing 1031). For example, Inner loop control laws 1028 may be configured to compensate for disturbances at the attitude and rate level in order to stabilize the aircraft. Additionally or alternatively, Inner loop control laws 1028 may consider periods of natural modes (e.g., phugoid modes) that affect the pitch axis, and may control the aircraft appropriately to compensate for such natural modes of the vehicle. In some embodiments, inner loop control laws 1028 may be dependent on vehicle inertia.

Inner loop control laws 1028 may determine moment commands using one or more stored dynamics models that reflect the motion characteristics of the aircraft (e.g., the aerodynamic damping and/or inertia of the aircraft). In some embodiments, the Inner loop control laws 1028 may use a dynamic model (e.g., a low order equivalent system model) to capture the motion characteristics of the aircraft and determine one or more moments that will cause the aircraft to achieve the commanded roll, yaw, and/or pitch. Some embodiments may include determining (e.g., by inner loop control laws 1028 or other component) a moment command based on at least one received command (e.g., a roll command, yaw command, and/or pitch command) and a determined (e.g., measured) aircraft state. For example, a moment command may be determined using a difference in the commanded aircraft state and the measured aircraft state. By way of further example, a moment command may be determined using the difference between a commanded roll angle and a measured roll angle. As described below, Control Allocation 1029 may control the aircraft (e.g., through flight elements) based on the determined moment command(s). For example, Control Allocation 1029 may control (e.g., transmit one or more commands to) one or more electric propulsion system(s) of the aircraft (e.g., electric propulsion system 602 shown in FIG. 6), including tilt actuator(s), electric engine(s), and/or propeller(s). Control Allocation 1029 may further control one or more control surface(s) of the aircraft (e.g., control surfaces 712 and 714 shown in FIG. 7), including flaperon(s), ruddervator(s), aileron(s), spoiler(s), rudder(s), and/or elevator(s). Vehicle dynamics 1030 represents the controlled flight elements (e.g., electric propulsion system(s) and/or control surfaces) and aircraft dynamics.

While the embodiment shown in FIG. 10 includes both Inner loop control laws 1028 and Outer loop allocation 1024, 1026, in some embodiments the flight control system may not include Outer loop allocation 1024, 1026. Therefore, a pilot inceptor input may create roll, yaw, pitch, and/or thrust commands. For example, a right inceptor may control roll and pitch and a left inceptor and/or pedal(s) may control yaw and thrust.

Control allocation 1029 may accept as inputs one or more of force and moment commands, data received from the one or more aircraft sensors, envelope protection limits, scheduling parameter, and optimizer parameters. Control allocation 1029 may be configured to determine, based on the inputs, actuator commands (e.g., thrust(s), torque(s), and/or propeller speeds for electric propulsion units) by minimizing an objective function that includes one or more primary objectives, such as meeting commanded aircraft forces and moments, and one or more secondary, which can include minimizing acoustic noise and/or optimizing battery pack usage.

In some embodiments, control allocation 1029 may be configured to compute the limits of individual actuator commands based on the actuator states and envelope protection limits. In normal operation, the minimum command limit for a given actuator includes the maximum of: the minimum hardware based limit and the minimum flight envelope limit; and the maximum command limit for a given actuator includes the minimum of: the maximum hardware based limit and the maximum flight envelope limit. In the case of an actuator failure, the command limits for the failed actuator correspond to the failure mode.

Control allocation 1029 sends commands to one or more flight elements to control the aircraft. The flight elements will move in accordance with the controlled command. Various sensing systems and associated sensors as part of Vehicle Dynamic Sensing 1031 may detect the movement of the flight elements and/or the dynamics of the aircraft and provide the information to Feedback 1012, 1016, 1018, 1022, Outer Loop allocation 1024, 1026, Inner Loop Control laws 1028, and Control Allocation 1029 to be incorporated into flight control.

As described above, Vehicle Sensing 1031 may include one or more sensors to detect vehicle dynamics. For example, Vehicle Sensing 1031 may capture how the aircraft moves in response to pilot inputs, propulsion system outputs or ambient conditions. Additionally or alternatively, Vehicle Sensing 1031 may detect an error in the aircraft's response based on exogenous disturbances (e.g., gust causing speed disturbance).

Further, Vehicle Sensing 1031 may include one or more sensors to detect propeller speed, such as a magnetic sensor (e.g., Hall effect or inductive sensor) or optical sensors (e.g., a tachometer) to detect the rotor speed of the aircraft engine (and thereby the speed of the propeller). Vehicle Sensing 1031 may include one or more sensors to detect a nacelle tilt angle (e.g., a propeller rotation axis angle between a lift configuration (e.g., FIG. 2) and forward thrust configuration (e.g., FIG. 1)). For example, one or more magnetic sensors (e.g., Hall effect or inductive sensor), position displacement sensors, linear displacement sensors, and/or other sensor(s) associated with the tilt actuator may detect a tilt angle (e.g., relative to the aircraft and/or wing), which may be provided to system 1000. Further, one or more pitot tubes, accelerometers, and/or gyroscopes may detect a pitch angle of the aircraft, which may be provided to system 1000. In some embodiments, Vehicle Sensing 1031 may combine tilt angle sensor measurements and aircraft pitch measurements to determine an overall nacelle tilt angle for the propellers. Vehicle Sensing 1031 may include one or more sensors configured to detect an engine torque and/or thrust, such as one or more current sensors or voltage sensors, strain gauges, load cells, and/or propeller vibration sensors (e.g., accelerometers).

Vehicle Sensing 1031 may include one or more sensors configured to detect vehicle dynamics, such as acceleration and/or pitch orientation sensors (e.g., accelerometer(s), 3-axis accelerometer(s), gyroscope(s), and/or 3-axis gyroscope(s)) and airspeed sensors (e.g., pitot tube sensors), Vehicle Sensing 1031 may further include one or more inertial measurement units (IMUs) to determine an aircraft state based on these measurements. An aircraft state may refer to forces experienced by, an orientation of, a position of (e.g., altitude), and/or movement of, the aircraft. For example, an aircraft state may include at least one of: a position of the aircraft (e.g., a yaw angle, roll angle, pitch angle, and/or any other orientation across one or two axes), velocity of the aircraft, angular rate of the aircraft (e.g., roll, pitch, and/or yaw rate), and/or an acceleration of the aircraft (e.g., longitudinal, lateral and/or vertical acceleration), or any physical characteristic of the aircraft or one of its components. In some embodiments, Vehicle Sensing 1031 may include an inertial navigation systems (INS) and/or an air data and/or an attitude heading reference systems (ADAHRS). The inertial navigation systems (INS) and/or an air data and attitude heading reference systems (ADAHRS) may include one or more inertial measurement units (IMUs) and corresponding sensors (e.g., accelerometers, gyroscopes, three-axis gyroscopes, and/or three-axis accelerometers). In some embodiments, the INS and/or ADAHRS may filter and/or otherwise process sensor measurements to determine an aircraft state (e.g., acceleration or angular rate). For example, in some embodiments, the INS and/or ADAHRS may determine angular rates based on gyroscope measurements and may determine acceleration based on measurements from an accelerometer.

Vehicle Sensing 1031 may include one or more sensors to detect a flight phase of the aircraft (e.g., a measured state of the aircraft). For example, Vehicle Sensing 1031 may include an air data system and/or air sensors (e.g., pitot tubes), gps sensors, tilt angle sensors, accelerometers, and/or gyroscopes to determine a flight phase. In some embodiments, a flight phase may be determined based on comparing one or more of these sensor measurements to pre-stored thresholds. For example, Vehicle Sensing 1031 and/or another section of System 1000 (e.g., Vibration Attenuation 1033) may determine a flight phase change when an aircraft airspeed exceeds a threshold and/or when an aircraft airspeed drops below a threshold and propeller tilt angle drops below a threshold. As described below with reference to FIG. 15, different relationships may be stored and associated with certain flight phases.

In some embodiments, as further described below, Vibration Attenuation 1033 may set one or more hard constraints and/or soft constraints for Control Allocation 1029. In some embodiments, Vibration Attenuation 1033 may determine, in whole or in part, at least one propeller parameter that may influence (e.g., restrict, control) a speed at which one or more propellers of the aircraft may spin to avoid commanding propellers to spin at speeds that cause elevated vibrations. For example, in some embodiments, Vibration Attenuation 1033 may set, as a hard constraint, one or more ranges of propeller torques and/or corresponding propeller speeds that Control Allocation 1029 must avoid when commanding the propellers of the aircraft. The torques may correspond to speeds that cause elevated (e.g., hazardous, avoidable, exceeding a threshold) propeller vibrations. In some embodiments, Vibration Attenuation 1033 may set, as a hard constraint, one or more ranges of propeller torques and/or corresponding propeller speeds that Control Allocation 1029 must maintain to avoid commanding propellers to spin at speeds that cause elevated (e.g., hazardous, avoidable, exceeding a threshold) vibrations. In some embodiments, Vibration Attenuation 1033 may set avoiding the propeller speed ranges corresponding to elevated (e.g., hazardous, avoidable, exceeding a threshold) vibrations as a soft constraint. For example, Vibration Attenuation 1033 may define one or more attractor parameters (e.g., corresponding to a target propeller speed and/or torque) for an optimization function to avoid these propeller torque ranges that correspond to increased propeller vibrations. Therefore, Control Allocation 1029 will determine torque commands that avoid those regions unless other objectives take priority.

As further described below, Vibration Attenuation 1033 may vary the avoidance ranges for propeller torque based on the state of the propellers (e.g., nacelle tilt angle) and the state of the aircraft (e.g., airspeed and/or flight phase). In some embodiments, Vibration Attenuation 1033 may receive feedback on the propeller speeds and may adjust the torque commands based on identifying that the speed of propeller(s) falls within one or more ranges corresponding to elevated vibrations.

In some embodiments, Vibration Attenuation 1033 may determine, in whole or in part, at least one propeller parameter that may influence (e.g., restrict, control) a speed at which one or more propellers of the aircraft may spin to avoid commanding multiple propellers to matching propeller speeds (e.g., identical propeller speed or within a threshold range). For example, at least one propeller parameter may indicates at least one of: a total difference in propeller speed across all propellers of the aircraft, a difference in propeller speed between pairs of propellers (e.g., each possible propeller pair combination) of the aircraft, and/or corresponding torques required for these speed differences. In some embodiments, Vibration Attenuation 1033 may set difference between the propeller speeds as a soft constraint to avoid magnification of vibrations caused by multiple propellers spinning at the same speed. Therefore, Control Allocation 1029 will determine torque commands that correspond to different speeds unless other objectives take priority.

Figure 11:
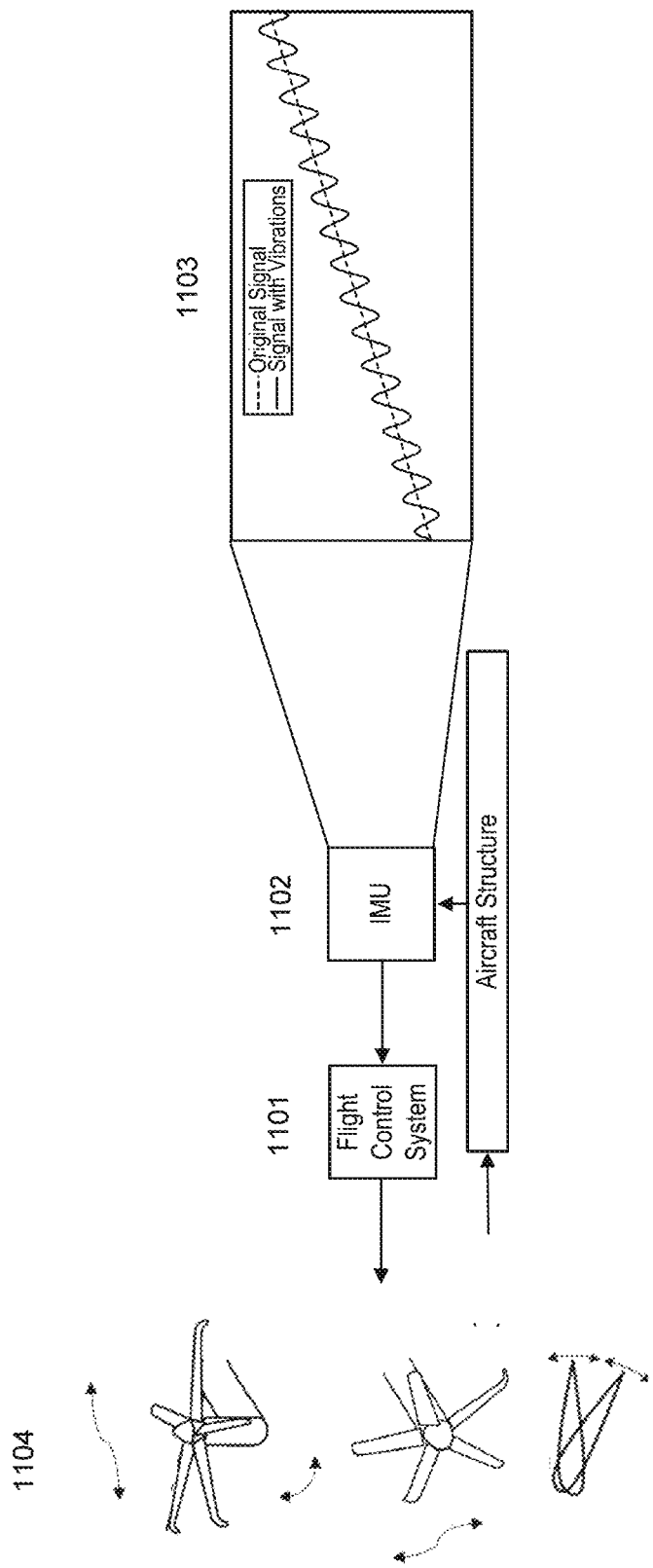
FIG. 11 illustrates effects of vibrations on a signal, consistent with disclosed embodiments.

FIG. 11 illustrates effects of vibrations on a signal, consistent with disclosed embodiments. As the propeller rotates it may generate significant vibrations at multiple frequencies proportional to the propeller rotational speed. These vibrations 1103 may be conducted through an engine and aircraft structure to an inertial measurement unit (IMU) 1102 (e.g., an IMU and corresponding accelerometer(s) in Vehicle Sensing 1031). Vibrations 1103 may corrupt the vehicle's state estimate based on IMU measurements, and may feed through to flight control system 1101, resulting in high-frequency commands to flight elements 1104. As described above, these high frequency commands may result in increased power consumption, increased aircraft component temperatures, increased aircraft component cycles and wear, and may contribute to increased cabin and community noise, as well as decreased ride quality.

Figure 12:
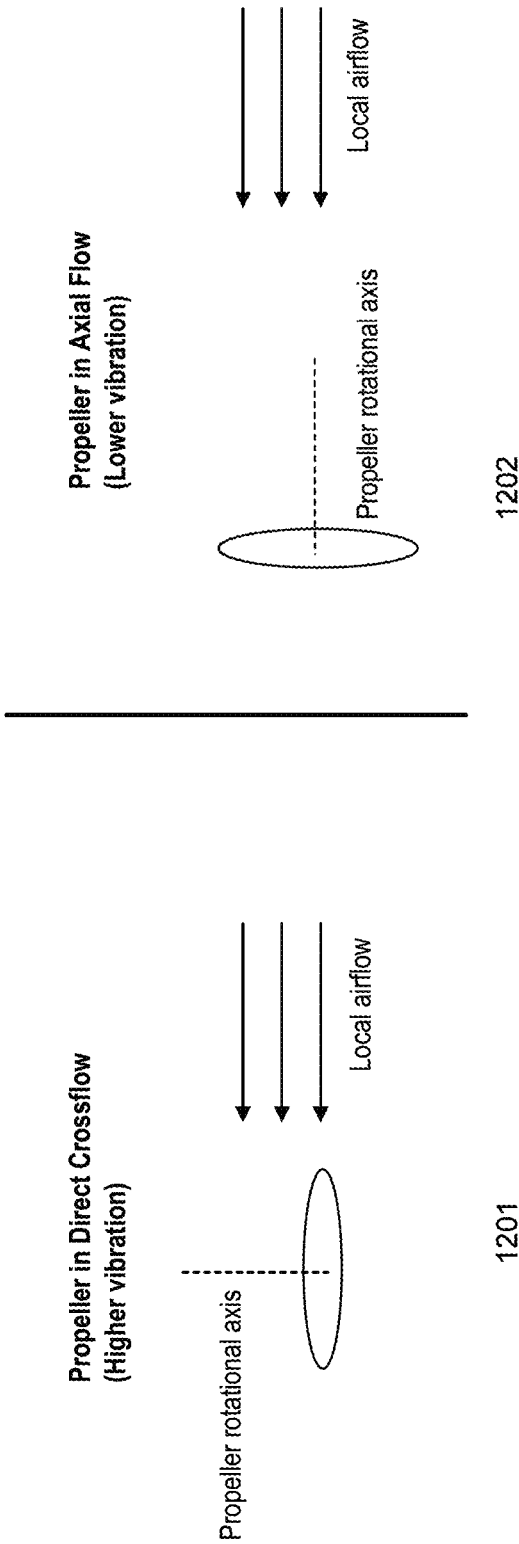
FIG. 12 illustrates a scenario where vibrations may be more significant, consistent with disclosed embodiments.

FIG. 12 illustrates a scenario where vibrations may be more significant, consistent with disclosed embodiments. Vibrations may be particularly strong and of a more disruptive frequency on two and three-bladed propellers, such as those used on one or more of the aft or lifter propellers of the aircraft in some embodiments of the present disclosure. Further, vibrations may be particularly strong when propellers are oriented in edgewise air flow as shown at 1201, such as when the rotation axis is perpendicular to the aircraft's trajectory. Vibrations may be less strong when propellers are oriented parallel to air flow as shown at 1202, such as when the rotation axis is parallel to the aircraft's trajectory. Therefore, any aircraft detailed in FIGS. 9A-9E above that include propellers oriented to experience edgewise air flow may be particularly susceptible to propeller vibrations. However, any aircraft with propellers may implement the present disclosure and would see benefits in doing so.

Figure 13:
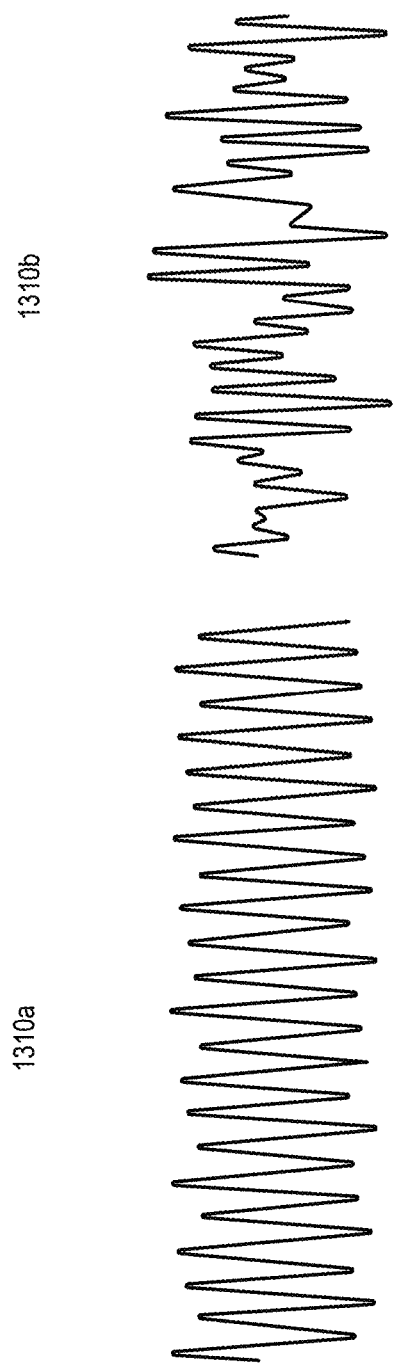
FIG. 13 illustrates another scenario where vibrations may be more significant, consistent with disclosed embodiments.

FIG. 13 illustrates another scenario where vibrations may be more significant, consistent with disclosed embodiments. Aircraft vibrations may be particularly strong when multiple propellers rotate at the same speed, such as represented by waveform 1310a. When propellers rotate at the same speed, their vibrations are cumulative, as shown by the more frequent high signal amplitudes. Aircraft vibrations may be less strong when propellers rotate at different speeds, such as represented by waveform 1310b. When the propellers rotate at different speeds, the effects of vibration are not cumulative, as shown by the lower signal amplitudes and less frequent high signal amplitudes.

Figure 14:
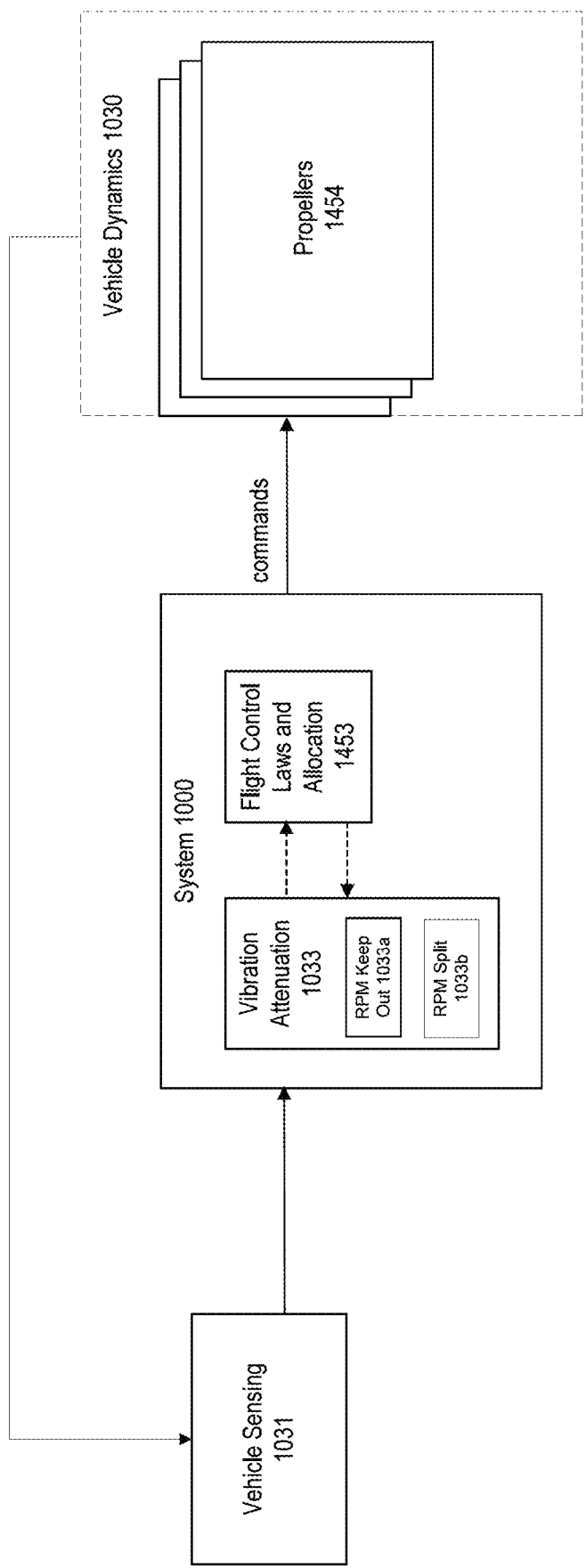
FIG. 14 illustrates aircraft control for vibration attenuation, consistent with disclosed embodiments.

FIG. 14 illustrates aircraft control for vibration attenuation consistent with disclosed embodiments. As described above, System 1000 may include at least one processor and at least one memory to receive pilot inceptor input, navigation input, sensor information (e.g., reflective of flight dynamics or flight conditions), determine control signals according to aircraft control laws and allocation, and send control signals to control the flight elements (e.g., control surfaces, propellers, tilt actuators).

Vibration Attenuation 1033 may include at least one processor and at least one memory. In some embodiments, Vibration Attenuation 1033 may be part of System 1000 (e.g., part of an FCC), while in other embodiments Vibration Attenuation 1033 may be separate.

Vibration Attenuation 1033 may receive aircraft state estimates and/or sensor data from Vehicle Sensing 1031. In some embodiments, Vehicle Sensing 1031 may include one or more sensors to measure a propeller speed(s) (e.g., an RPM). For example, Vehicle Sensing 1031 may include one or more magnetic sensors (e.g., hall effect or inductive sensor) and/or optical sensors (e.g., a tachometer) to determine propeller speed(s). In some embodiments, Vehicle Sensing 1031 may include one or more sensors to determine an air density (e.g., pressure and temperature sensor(s)).

In some embodiments, Vehicle Sensing 1031 and/or Vibration Attenuation 1033 may determine at least one propeller speed based on measured airspeed and measured air density. Vehicle Sensing 1031 and/or Vibration Attenuation 1033 may determine propeller speed(s) based on a predetermined propeller speed and predetermined air density at the measured airspeed. For example, the propeller speed may be determined based on the predetermined propeller speed and predetermined air density at sea level for the measured airspeed. The predetermined propeller speed and predetermined air density at sea level may be determined prior to flight based on propeller speed and/or air density measurements taken in flight at sea level at the measured airspeed, by modeling propeller speed and/or air density at sea level at the measured airspeed, and/or by using one or more algorithms to determine propeller speed and/or air density at sea level at the measured airspeed.
For example, $$\Omega_{determine} = \Omega_{sea\ level} \sqrt{\frac{\rho_{sea\ level}}{\rho_{measured}}}\ ; \Omega_-(\text{sea level}) = f(V_{airspeed}),\ \Omega_{determine} =$$

propeller speed, $\Omega_{sea\ level}$ = propeller speed at sea level, $\rho_{sea\ level}$ = air density at sea level, $\rho_{measured}$ = measured air density, and $V_{airspeed}$ = measured aircraft airspeed.

In some embodiments, Vehicle Sensing 1031 may include an inertial navigation system, inertial measurement unit(s), and/or inertial sensors (e.g., accelerometer, gyroscope, magnetometer). In some embodiments, Vehicle Sensing 1031 may include one or more air speed sensors (e.g., pitot tube pressure sensor(s)). In some embodiments, Vehicle Sensing 1031 may include one or more tilt angle sensors to determine the tilt angle of the propellers, such as a magnetic sensor that determines a degree of tilt between lift configuration (e.g., FIG. 2) and forward thrust configuration (e.g., FIG. 1). In some embodiments, Vehicle Sensing 1031 may include one or more microphones in and/or on the aircraft.

Vibration Attenuation 1033 may receive pilot input indicating a commanded aircraft state (e.g., from an inceptor), an autopilot, and/or one or more sections of System 1000. For example, some embodiments, the commanded aircraft state may be from Command models (e.g., 1004, 1006, 1008, and/or 1010), from Outer Loop Allocation (e.g., 1024 and/or 1026), and/or from Inner Loop Control Laws (e.g., 1028).

In some embodiments, as further described below, Vibration Attenuation 1033 may store one or more functions, one or more data tables, and/or one or more models to convert propeller speeds into corresponding torque values. For example, Vibration Attenuation 1033 may convert propeller speeds into corresponding torque commands based on a flight phase.

In some embodiments, Vibration Attenuation 1033 may include one or more functions (e.g., implemented within module(s), script(s), application(s), and/or program(s)) to control propeller rotation speed to reduce propeller vibration and/or to reduce noise. In some embodiments, Vibration Attenuation 1033 may include a function RPM Keep Out 1033a and, optionally, associated data tables and/or models. As further detailed below, RPM Keep Out 1033a may control the torque commands to avoid propeller speeds that correspond to elevated vibrations. In some embodiments, Vibration Attenuation 1033 may include a function RPM Split 1033b and, optionally, associated data tables and/or models. As further detailed below, RPM Split 1033b may control torque commands to avoid matching propeller speeds across multiple propellers.

Based on the one or more functions, Vibration Attenuation 1033 may provide one or more inputs to Flight Control Laws 1453 (e.g., boxes of FIG. 10 other than Vibration Attenuation 1033), such as the optimizer function(s) of Control Allocation 1029. For example, Vibration Attenuation 1033 may provide one or more soft constraints (e.g., flexible and/or deprioritized) and/or hard constraints (e.g., inflexible constraints, firm constraints, higher priority constraints) that are used by Control Allocation 1029 to determine propeller commands. In some embodiments, these inputs may be specific to each propeller of the aircraft. Flight Control Laws 1453 (e.g., Control Allocation 1029) may determine propeller commands (e.g., torque commands) to be sent to the propellers based on the soft constraints and/or hard constraints. Further, these propeller commands may be determined to cause a commanded aircraft state (e.g., thrust vector and/or moment) while satisfying the constraint(s), thereby avoiding increased aircraft vibrations.

In some embodiments, Flight Control Laws 1453 (e.g., Control Allocation 1029) may prioritize different constraints. For example, Flight Control Laws 1453 may prioritize between constraints of maintaining lift and/or forward thrust support, meeting a load requirement (e.g., a root load at the wing), meeting a battery requirement, meeting a high voltage power limitation requirement, avoiding a propeller speed keep-out range, meeting engine thermal requirements, and avoiding matching propeller speeds across different propellers (e.g., certain combination of propellers, two propellers, more than two propellers, etc.). In some embodiments, Flight Control Laws 1453 (e.g., Control Allocation 1029) may prioritize avoiding a propeller speed keep-out range (e.g., based on constraints from RPM Keep Out 1033a) over avoiding matching propeller speeds (e.g., based on constraints from RPM Split 1033b). For example, if Control Allocation 1029 cannot determine a way to control propeller speeds to achieve both constraints, Control Allocation 1029 will output signals to one or more EPUs (e.g., which rotate respective propellers 1454) that are part of vehicle dynamics control 1030 to cause respective propellers associated with the EPUS to meet the propeller speed keep-out range constraint over the constraint to avoid matching propeller speeds. In some embodiments, as further detailed below, Control Allocation 1029 may prioritize reducing propeller vibration over reducing noise emission. For example, Control Allocation 1029 may be configured to only control propellers to RPM speed(s) that reduce noise emissions if doing so has a neutral or positive effect on reducing propeller vibration. Further, Control Allocation 1029 may be configured to control propellers to only RPM speed(s) that reduce propeller vibration even if doing so results in an increase in noise emission.

Figure 15:
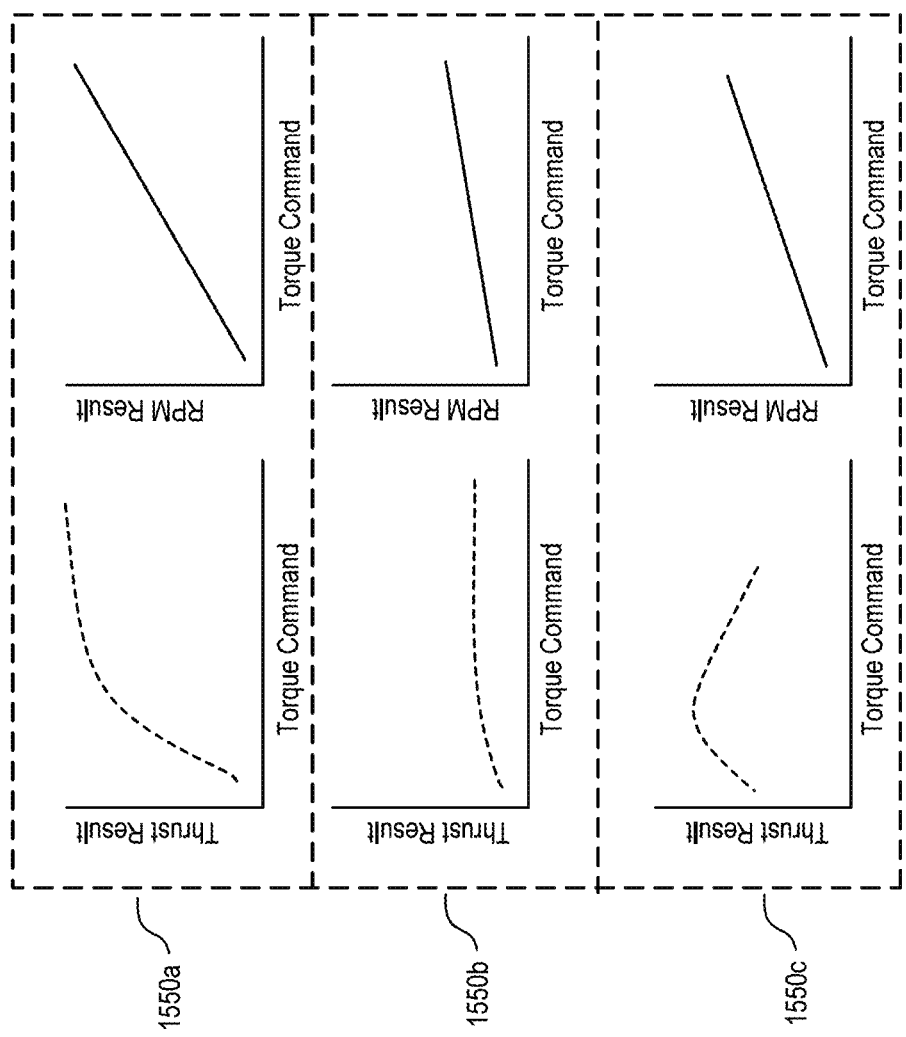
FIG. 15 illustrates an aerodynamic model, consistent with disclosed embodiments.

FIG. 15 illustrates an aerodynamic model, consistent with disclosed embodiments. In some embodiments, System 1000, including Flight Control Laws 1453 and/or Vibration Attenuation 1033 may store one or more aerodynamic models, which may model (e.g., statically or dynamically) aircraft and/or aircraft component conditions based on one or more parameters (e.g., a command, an aircraft orientation, an aircraft flight phase, a battery charge amount, or a measured contextual attribute such as speed, altitude, or crosswind). For example, System 1000, including Control Allocation 1029 may store models, such as those shown in FIG. 15, detailing a relationship between torque, thrust, and propeller speed (e.g., in a storage medium that is part of or separate from Control Allocation 1029), based on a phase of flight. Control Allocation 1029 may use these models to determine a required torque command that meets a commanded thrust and/or propeller speed requirement (e.g., to avoid vibrations).

As described above, in some embodiments, the one or more aerodynamic models may correspond to a phase of flight. One or more models 1550a may represent a stored relationship between thrust, torque, and propeller speed when the aircraft is in a hover phase. One or more models 1550b may represent a stored relationship between thrust, torque, and propeller speed when the aircraft is in an forward flight condition. One or more models 1550c may represent a stored relationship between thrust, torque, and propeller speed when the aircraft is in a different flight phase. System 1000 may store these relationships as functions, models, and/or look-up tables.

Flight Control Laws 1453 reference these relationships to ensure an aircraft is controlled as commanded (e.g., commands determined by Inner Loop Control Laws 1028), based on the relationship between thrust and torque. Further, Vibration Attenuation 1033 may reference these relationships to determine at least one torque command that achieves the required propeller speed variation (e.g., for RPM Split 1033b), avoids propeller speeds corresponding to high vibration (e.g., for RPM Keep Out 1033a), and/or does not violate any constraint (e.g., aircraft thrust requirements), based on the relationship between propeller speed, torque, and thrust.

Figure 16A:
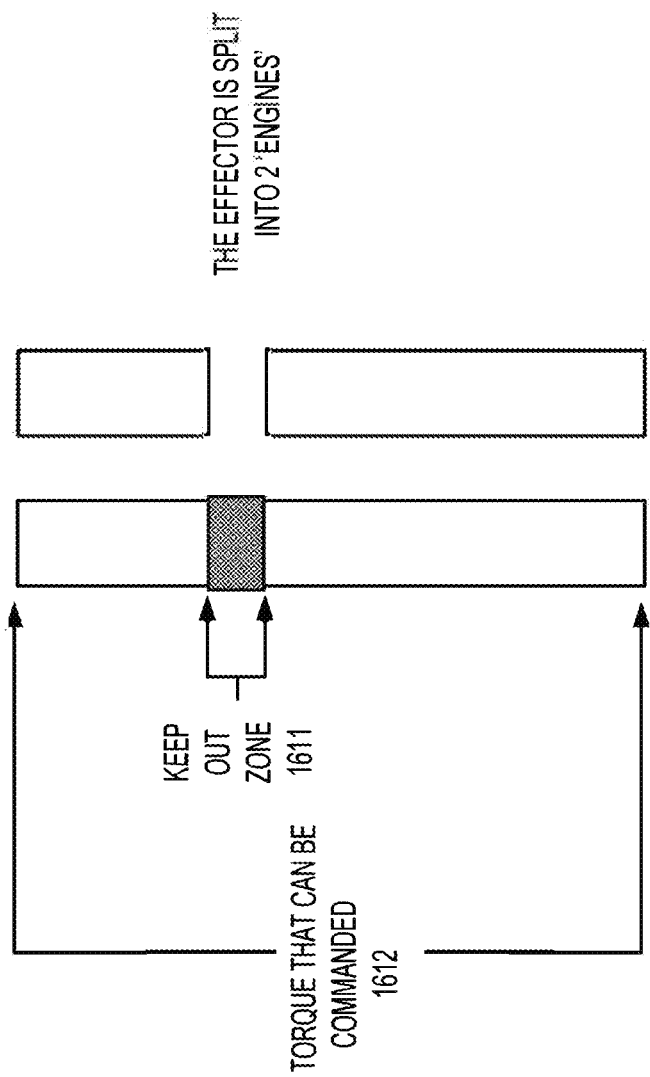
FIG. 16A and FIG. 16B illustrates an exemplary command for vibration attenuation based on avoiding propeller keep-out zones, consistent with disclosed embodiments.
Figure 16B:
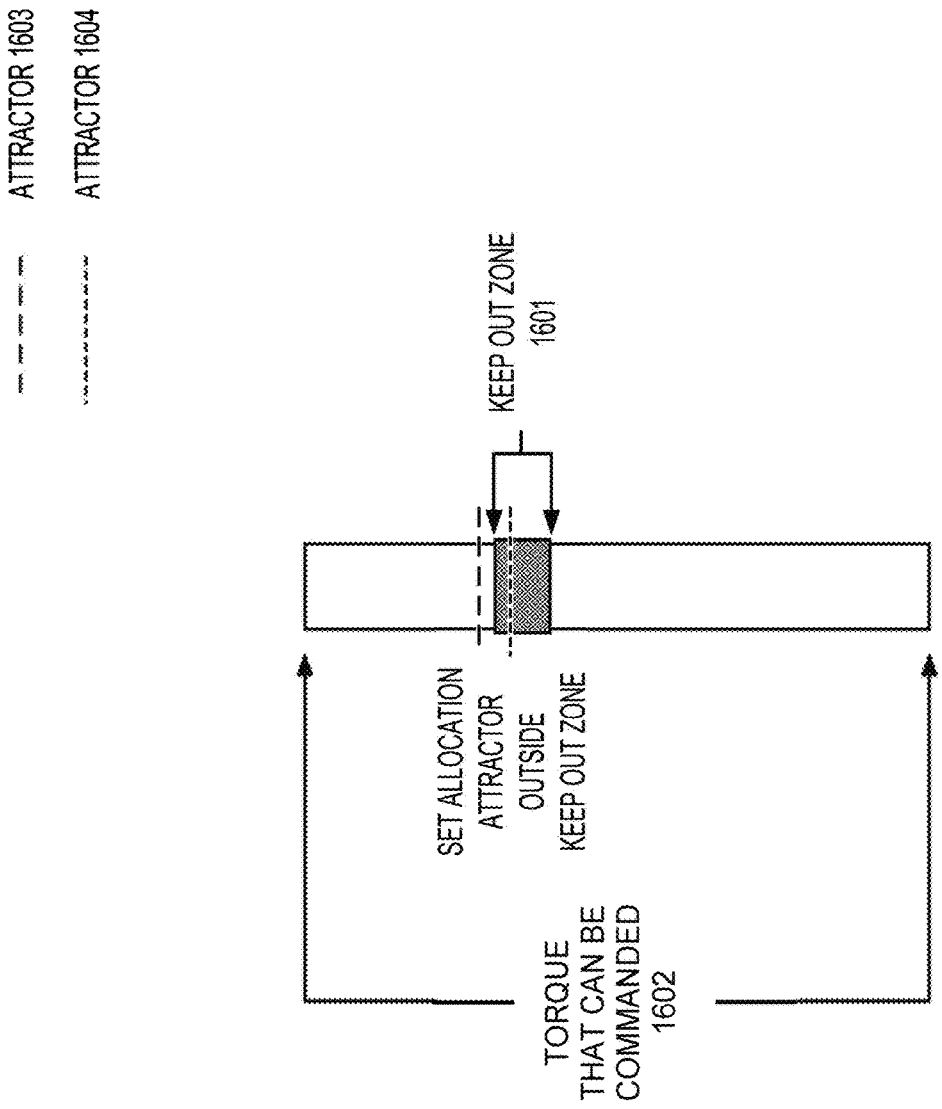

While only three flight phases and corresponding relationships are shown in FIG. 15, System 1000 may store any number of relationships corresponding to different phases of flight. For example, system 1000 may store relationships based on incremental changes to aircraft speed and/or propeller tilt angle. For example, System 1000 may store different relationships corresponding to a 2%, 5%, 10% etc. change in aircraft speed, propeller tilt angle, and/or other conditions that affect the relationship between thrust, torque, and propeller speed. In some embodiments, System 1000 may store models and/or algorithms and aircraft speed, propeller tilt angle, and/or other conditions may be inputs to determine the appropriate relationship between thrust, torque, and propeller speed. In some embodiments, the propeller speed FIG. 16A and FIG. 16B illustrate an exemplary command for vibration attenuation based on avoiding propeller keep-out zones, consistent with disclosed embodiments. In some embodiments, RPM Keep Out 1033a may determine one or more propeller speed ranges corresponding to elevated vibrations. In some embodiments, RPM Keep Out 1033a may retrieve at least one propeller parameter associated with propeller speeds that avoid an elevated vibratory response in the aircraft. For example, in some embodiments, RPM Keep Out 1033a may store and retrieve propeller speed keep-out range(s) that corresponds to elevated (e.g., hazardous) vibrations in the aircraft and/or aircraft components (e.g., aircraft body, propellers, booms, wings etc.) based on experimental data and/or modeling. For example, propeller vibration (e.g., at N/rev frequency) may be measured across all propeller speeds the propeller may encounter to determine which propeller speeds create elevated vibrations. Elevated vibrations may include vibrations that exceed a predetermined threshold, distort acceleration measurements, cause aircraft stability issues, cause engine performance issues, cause controllability issues, cause structural issues, strain one or more aircraft components, cause an aircraft component to exhibit behavior outside of a predetermined operational limit (e.g., interference limit, strain limit, force limit, etc.), and/or are otherwise non-ideal for aircraft operation. Propeller speed ranges corresponding to the elevated vibrations may be stored as the propeller speed keep-out range(s). Propeller speed "keep-out" and "avoidance" ranges and/or zones are used interchangeably to reference a propeller speed range (e.g., for one or more propellers) corresponding to elevated (e.g., hazardous) vibrations.

In some embodiments, the propeller speed keep-out range(s) may vary based on edgewise airflow, which may be a function of airspeed, wind conditions, and/or tilt configuration of propeller(s). For example, as shown above in FIG. 12 configuration 1201, a propeller may experience more significant vibrations when in edgewise cross flow. Therefore, the propeller speed keep-out range may be larger in these conditions, such as when the propeller rotation axis is perpendicular to the aircraft trajectory (e.g., in a lift configuration) and when the aircraft airspeed is higher. Therefore, RPM Keep Out 1033a may be configured to increase a propeller speed avoidance range based on an airspeed of the aircraft and a propeller angle indicating an increase in edgewise airflow.

Therefore, in some embodiments, RPM Keep Out 1033a may dynamically change the propeller speed keep-out zones based on the airspeed and/or propeller angle. For example, a propeller speed may correspond to a keep-out range when a propeller is in a lift configuration but may not correspond to a keep-out range when the propeller is in a thrust configuration. In some embodiments, a propeller speed may correspond to a keep-out range at high airspeeds, but not at low airspeeds.

In some embodiments, RPM Keep Out 1033a may store one or more algorithms to adjust the propeller speed keep-out range(s) based on the airspeed and/or propeller angle (e.g., dynamically during flight). In some embodiments, RPM Keep Out 1033a may store one or more tables or models to determine propeller speed keep-out range(s) based on the airspeed and/or propeller angle (flight conditions). In some embodiments, a propeller angle may be measured for each individual propeller and the propeller speed keep out range for each propeller may be adjusted based on the respective propeller angle measurement. In some embodiments, a propeller angle measurement may indicate or correspond to the angle of a group of propellers (e.g., all front propellers) and the propeller speed keep-out range for the group of propellers may be adjusted based on the respective propeller angle measurement. In some embodiments, a propeller angle measurement may indicate or correspond to the angle of all propellers (e.g., all front propellers) and the propeller speed keep-out range for all propellers may be adjusted based on the propeller angle measurement. In some embodiments, RPM Keep Out 1033a may correlate a size of a propeller speed keep-out range with at least one of a propeller rotation axis relative to an aircraft trajectory or an airspeed of the aircraft. For example, RPM Keep Out 1033a may determine a larger propeller speed keep-out range in certain flight conditions where vibrations are more significant, such as when the propeller rotation axis is perpendicular to the aircraft trajectory (e.g., in a lift configuration) and when the airspeed is higher (indicating greater edgewise airflow).

In some embodiments, RPM Keep Out 1033a algorithms, tables, and/or models may further include an impact of wind conditions that contribute to edgewise airflow (e.g., FIG. 12 configuration 1201). In some embodiments, RPM Keep Out 1033a may adjust inputs based on a relationship between the propeller speed keep-out range and torque(s) for a determined phase of flight (e.g., using the relationships shown in FIG. 15).

As shown in FIG. 16A, in some embodiments, RPM Keep Out 1033a may apply a hard constraint for one or more propeller speed keep-out range(s). For example, in some embodiments, RPM Keep Out 1033a may provide at least one range of available torques that exclude torques corresponding to the propeller speed keep-out range(s) for each propeller. Therefore, Flight Control laws (e.g., Control Allocation 1029) will not (e.g., cannot) command propeller(s) to speeds corresponding to elevated (e.g., hazardous) vibrations, despite any contrary command (e.g., received at an inceptor). In some embodiments, RPM Keep Out 1033a may provide available propeller speeds that exclude propeller speed keep-out ranges and/or may provide the propeller speed keep-out ranges (corresponding to elevated vibrations) to Flight Control laws (e.g., Control Allocation 1029). Flight Control laws will determine the torques associated with the received propeller speed values and control propeller speed to avoid the elevated (e.g., hazardous) vibration, despite any contrary command (e.g., received at an inceptor).

As shown in FIG. 16B, in some embodiments, RPM Keep Out 1033a may apply a soft constraint for one or more propeller speed keep-out range(s). In some embodiments, System 1000 may include control allocation function(s) (e.g., online control allocation and/or an optimization function(s)) to determine propeller commands given a variety of inputs, such as commanded aircraft state requirements (e.g. aircraft thrust and/or moments), hard constraints, and soft constraints. For example, Control Allocation 1029 may determine propeller commands in consideration of load and maneuver alleviation preferences, battery pack conditions, and/or flight condition constraints (e.g., maximum propeller RPM to avoid vortex ring state).

In some embodiments, the aircraft may be over-actuated, and Control Allocation 1029 may be configured to generate a plurality of solutions for each set of commands (e.g., commands from Inner loop control laws 1028). Based on the plurality of solutions, Control Allocation 1029 may determine an optimal solution based on the constraints. In some embodiments, one or more soft constraints may be applied as an attractor. Control Allocation 1029 may apply a propeller parameter indicating a respective target torque value and/or corresponding target propeller speed as an attractor in an allocation function (e.g., an allocation function configured to determine a combination of propeller commands that achieve a determined thrust). RPM Keep Out 1033*a* may move and/or apply at least one attractor (e.g., an attractor value, an attractor set of values, an attractor curve, attractor manifold, or other attractor state representation) configured to cause system 1000 to avoid using torque values that correspond to propeller speeds inside the propeller speed keep-out zone. For example, to avoid propeller torque commands corresponding to propeller speed keep-out zone 1601, RPM Keep Out 1033*a* may set an attractor 1603 or move an existing attractor 1604 to the location indicated for attractor 1603. Therefore, Control Allocation 1029 will prioritize a control solution for the electric engine(s) that avoids this propeller being commanded to a propeller speed corresponding to more significant vibrations. As described above, in some embodiments, the propeller speed keep-out zone may vary for each propeller (e.g., based on an angle of the propeller). In some embodiments, an attractor may be determined for each propeller of the aircraft and/or a group of propellers (e.g., all propellers with a similar propeller angle).

In some embodiments, a combination of soft constraints and hard constraints may be employed. Vibration Attenuation 1033 may apply soft constraints (e.g., an attractor value shown in FIG. 16B) for keep-out zones associated with less severe vibrations. For example, Vibration Attenuation 1033 may apply soft constraints when expected vibrations are below a stored threshold. Vibration Attenuation 1033 may apply hard constraints (e.g., a split range shown in FIG. 16A) for keep-out zones associated with more severe vibrations. For example, Vibration Attenuation 1033 may apply hard constraints when expected vibrations are above the stored threshold.

While the above propeller speed control is based on avoiding elevated vibrations, in some embodiments the RPM keep out zones may correspond to propeller speeds that create excessive noise emissions. For example, RPM Keep Out 1033*a* may store propeller speed keep out zones that meet noise objectives based on modeling and/or testing the effects of the propeller speed on the aircraft's noise emissions (e.g., psychoacoustic noise). In some embodiments, RPM Keep Out 1033*a* and/or system 1000 may prioritize between a vibration objective and a noise objective. For example, in some embodiments, if a combination of propeller speeds cannot be determined to meet both objectives while providing the required thrust, a vibration objective (e.g., avoiding RPM keep out zone) may be prioritized. In some embodiments, RPM Keep Out 1033*a* and/or system 1000 may prioritize between a vibration objective, a noise objective, and/or other criteria (e.g., other soft constraints described above). In some embodiments, the prioritization may vary based on a phase of flight. For example, a noise objective may be given more weight in a hover phase (e.g., when the aircraft is landing or taking off) and closer to people on the ground. In a forward flight phase, the noise objective may be de-prioritized or removed.

Figure 16C:
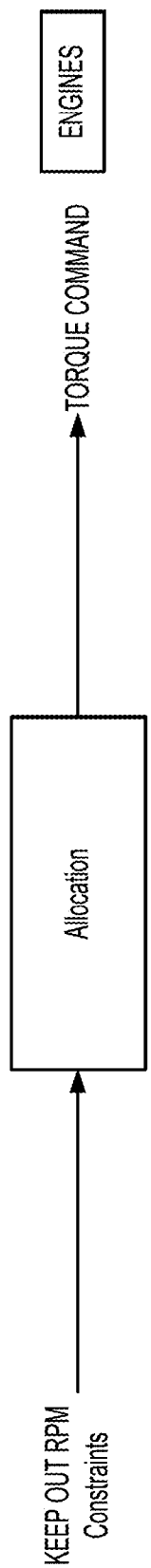
FIG. 16C illustrates a process for avoiding propeller speeds with elevated vibrations, consistent with disclosed embodiments.

FIG. 16C illustrates a process for avoiding propeller speeds with elevated vibrations, consistent with disclosed embodiments. In some embodiments, Vibration Attenuation 1033 may determine hard and/or soft constraints, as described above with respect to FIG. 16A-16B. These constraints may be provided to Control Allocation 1029 which may one or more generate electric engine commands (e.g., torque commands) based on the constraints.

Figure 16D:
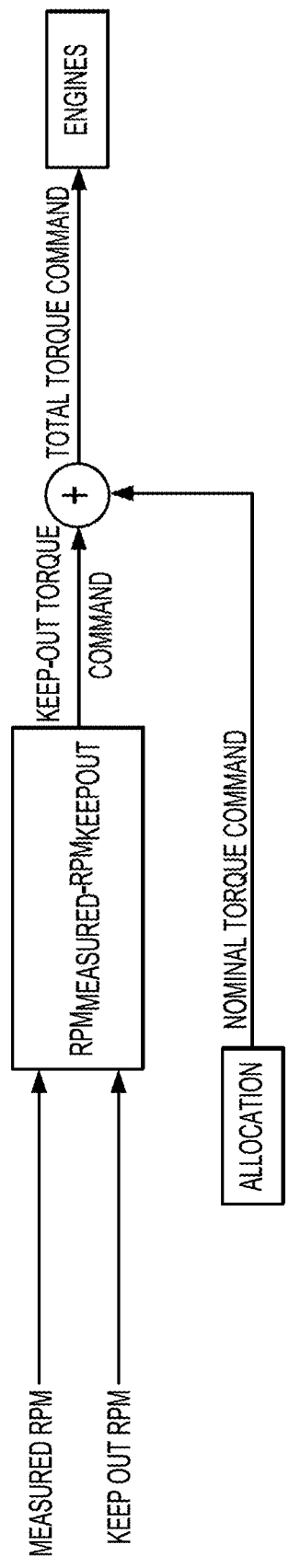
FIG. 16D illustrates another process for avoiding propeller speeds with elevated vibrations, consistent with disclosed embodiments.

FIG. 16D illustrates another process for avoiding propeller speeds with elevated vibrations, consistent with disclosed embodiments. In some embodiments, Vibration Attenuation 1033 may compare the measured propeller speeds (e.g., from Vehicle Sensing 1031) to the propeller speed keep-out range(s), and adjust the electric engine command (e.g., torque command), which may cause an increase or decrease in one or more propeller speeds, if the measured propeller speed is within the propeller speed keep-out range. In some embodiments, adjusting the electric engine command (e.g., torque command) may involve determining a difference between the measured propeller speed and the edge of the propeller speed keep-out range. In some embodiments, Vibration Attenuation 1033 may then adjust the electric engine command based on this difference. For example, Vibration Attenuation 1033 may make a proportional adjustment to an electric engine command based on fraction of deviation from the edge of the propeller speed keep-out range and/or make an adjustment based on a torque difference (measured-keep-out edge) determined using the torque-speed relationship for the flight phase. In some embodiments, as described above, Vibration Attenuation 1033 may apply or move a torque attractor to get the propeller speed out of the propeller speed keep-out zone. Control Allocation 1029 may send the electric engine commands to control the electric engines.

Figure 16E:
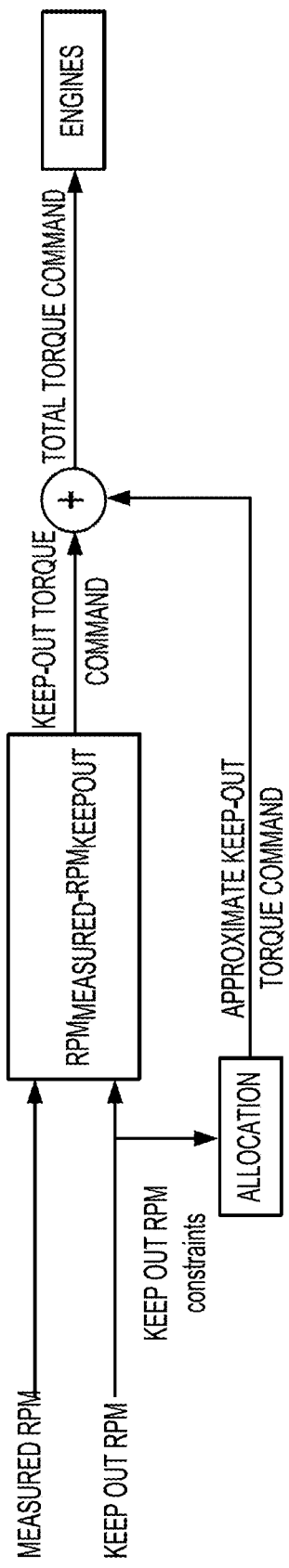
FIG. 16E illustrates another process for avoiding propeller speeds with elevated vibrations, consistent with disclosed embodiments.

FIG. 16E illustrates another process for avoiding propeller speeds with elevated vibrations, consistent with disclosed embodiments. In some embodiments, as described above with respect to FIG. 16C, an electric engine command is based on the propeller speed keep-out zone(s) (e.g., using the hard and/or soft constraints shown in FIG. 16A-16B).

In some embodiments, as described above with reference to FIG. 16D, Vibration Attenuation 1033 may compare the measured propeller speeds to the propeller speed keep-out range(s), and adjust the electric engine command if the measured propeller speed is within the propeller speed keep-out range. Control Allocation 1029 may send the electric engine commands to control the electric engines.

Figure 17A:
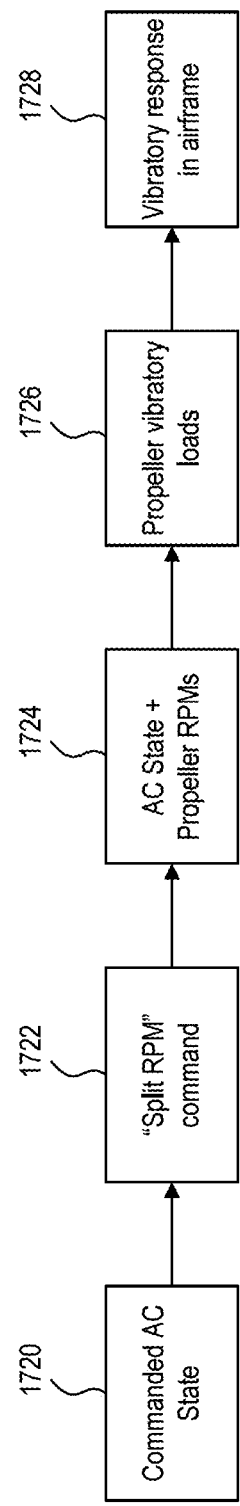
FIG. 17A illustrates a block diagram for vibration attenuation based on splitting propeller speeds across multiple propellers using a feedforward configuration, consistent with disclosed embodiments.

FIG. 17A illustrates a block diagram for vibration attenuation based on splitting propeller speeds across multiple propellers using a feedforward configuration, consistent with disclosed embodiments. At Step 1720, RPM Split 1033*b* may receive a commanded aircraft state (e.g., may receive pilot input indicating a commanded aircraft state). For example, RPM Split 1033*b* may receive a commanded aircraft state from one or more pilot inceptors, autopilot systems, and/or other functions of System 1000 (e.g., from Inner loop control laws 1028). In some embodiments, the commanded aircraft state may be a steady state (e.g., maintaining a direction of flight).

Step 1720 may also include determining an aircraft thrust for achieving the commanded aircraft state (e.g., according to Control Allocation 1029) and/or to maintain (e.g., within one or more threshold margins) an existing aircraft state (e.g., aircraft trim, aircraft speed, state of flight, altitude, and/or combination thereof). In some embodiments, an aircraft thrust may be associated with (e.g., may include, may be represented by, may be achieved by) a force vector applied by the aircraft propellers. At Step 1722, RPM Split 1033*b* and/or other another function of System 1000 may retrieve at least one propeller parameter associated with propeller speeds that avoid an elevated (e.g., hazardous) vibratory response in the aircraft. Additionally, RPM Split 1033*b* and/or other another function of System 1000 may determine a respective command for each propeller of the aircraft to achieve the determined aircraft thrust based on the at least one propeller parameter. For example, RPM Split 1033b and/or other another function of System 1000 may determine propeller speed(s) and/or torques that match the thrust requirements of the commanded aircraft state, while avoiding commanding multiple propellers (e.g., all propellers of the aircraft, a predetermined set of propellers of the aircraft) to the same propeller speed.

In some embodiments, Vibration Attenuation 1033 may determine the respective command for each propeller of the aircraft based on determining a combination of propeller commands (e.g., a command to each propeller of the aircraft) that results in each propeller of the aircraft being controlled to a different speed (e.g., different according to a minimum difference between propellers and/or total difference). In some embodiments, Vibration Attenuation 1033 may determine the respective command for each propeller of the aircraft based on determining a combination of propeller commands that result in each propeller on a wing (e.g., a left wing or right wing) being controlled to a different speed.

In some embodiments, RPM Split 1033b may determine and/or store propeller speed differences to apply to ensure each propeller speed for each propeller is different from all others on the aircraft. For example, in some embodiments, RPM Split 1033b may determine and/or store a total speed difference that the propellers speeds are spread across (e.g., total 500 RPM across all propellers, between a fastest and slowest propeller of the aircraft). In some embodiments, RPM Split 1033b may determine and/or store speed difference(s) between individual propellers (e.g., a difference in speed between each propeller for all propellers of the aircraft). In some embodiments, while the term "difference" is used, it is appreciated that a range (or multiple ranges) may be used instead of, or in addition to, one or more differences.

In some embodiments, RPM Split 1033b may store speed difference(s) for each propeller and those differences may ensure the aircraft's orientation (e.g., yaw, roll, and/or bank), lift, and/or forward thrust is unchanged (or only minimally changed subject to higher priority constraints). For example, a reduced propeller speed for one propeller on a side of a wing may be offset by an increased propeller speed for another propeller on the same side of the wing.

In some embodiments, RPM Split 1033b may store one or more functions that randomly apply propeller speed differences to each propeller. For example, each propeller speed may be changed by a random amount such that the total propeller speed change is spread across a set total speed difference. In some embodiments, initial propeller speeds (and/or torque commands) for each propeller are determined (e.g., by System 1000) to achieve the commanded aircraft state, and then the initial propeller speeds (and/or torque commands) are adjusted to avoid commanding multiple propellers to the same propeller speed (e.g., by adjusting the propeller speeds by a random amount to meet a total speed difference, as described above).

In some embodiments, the stored and/or determined propeller speed differences may be selected to meet a vibration standard, noise standard, fatigue life target (e.g., of the aircraft structure, frame, and/or equipment), cabin vibration standard, and/or other defined objective. For example, RPM Split 1033b may store propeller speed differences that meet these objectives based on modeling and/or testing the effects of the propeller speed on the aircraft's vibration and/or noise (e.g., physical testing, virtual testing, or machine learning-based testing). In some embodiments, the propeller speed difference may correspond to a difference in the range of a 0.5%-10% difference in propeller speeds between individual propellers.

In some embodiments, RPM Split 1033b may determine the propeller speed differences based on one or more flight conditions. For example, RPM Split 1033b may determine the propeller speed differences based on one or more of propeller speed(s) (e.g., an average propeller speed across a group or all propellers), propeller tilt angle(s) (e.g., an average tilt angle), or airspeed. For example, RPM Split 1033b may determine a larger speed difference in certain flight conditions where vibrations are more significant, such as when the propeller rotation axis is perpendicular to the aircraft trajectory (e.g., in a lift configuration) and when the aircraft airspeed is higher (indicating greater edgewise airflow). Therefore, RPM Split 1033b may increase a difference in propeller speeds (e.g., difference speeds between individual propellers and/or across all propellers) based on the airspeed and the propeller angle indicating an increase in edgewise airflow. The speed difference(s) to be applied based on the flight conditions may be stored in one or more models, tables, and/or algorithms in System 1000 (e.g., in RPM Split 1033b) and referenced by RPM Split 1033b to dynamically change speed difference(s) throughout flight.

In some embodiments, one or more functions of System 1000 may determine whether the thrust provided by the propellers at the changed propeller speed is sufficient and/or whether other aircraft constraints are met. For example, as described above, Control Allocation 1029 may store one or more optimizer function(s) that determines engine commands (e.g., torque commands) that will achieve the commanded aircraft state while also meeting other hard and/or soft constraints. In some embodiments, RPM Split 1033b may determine a torque and/or thrust change that corresponds to the propeller speed change. For example, RPM Split 1033b may reference one or more relationships (e.g., FIG. 15) to determine a propeller torque and/or thrust that corresponds to the propeller at the changed speed.

In some embodiments, Control Allocation 1029 may determine whether the torque and/or thrust of the propellers at the changed speeds meets other constraints, such as maintaining lift and/or forward thrust support, meeting a load requirement (e.g., a root load at the wing), meeting a battery requirement, meeting a high voltage power limitation requirement, avoiding an RPM keep-out zone, meeting engine thermal requirements etc. In some embodiments, if a propeller at the changed speed does not meet these requirements, RPM Split 1033b and/or Control Allocation 1029 may adjust the propeller speed(s) of one or more propellers to meet the constraints. In some embodiments, RPM Split 1033b may apply the changed propeller speed and/or torque at the changed propeller speed as a soft constraint (e.g., to Control Allocation 1029). For example, RPM Split 1033b may apply an attractor value for each propeller corresponding to torque at the changed propeller speed.

In some embodiments, RPM Split 1033b may randomly allocate different torque values to different propellers to meet the target aircraft thrust (e.g., from commanded AC state, at step 1720). Propellers may be commanded to different speeds while maintaining the trim state of the aircraft (e.g., trim of effectors, such as propellers and the aircraft control surfaces, which may be determined by pilot input and/or control laws). In some embodiments, in response to changes in an aircraft trim, the speed of one or more propellers may be changed to maintain an updated aircraft trim while still targeting a reduction in a vibratory response. In some embodiments, the aircraft trim state may be maintained within a threshold margin. In some embodiments, the random allocation of torque values may be over a set total torque value difference. As described above, in some embodiments, propeller speeds and/or torques may be determined based on one or more trim state constraints (e.g., constraints configured to maintain a trim state). For example, signal output combinations that control aircraft components so as to satisfy the one or more trim states may be determined (e.g., by an FCC) and propeller speeds and/or a torque values may be determined that exits within or is compatible with at least one of the combinations.

In some embodiments, following the random allocation of torque values, RPM Split 1033*b* may check whether there is sufficient spread in propeller speeds corresponding to the torque values. RPM Split 1033*b* may check whether there is sufficient spread in propeller speeds based on stored parameter(s) (e.g., threshold(s), range(s)) that indicate a required spread. For example, propeller speeds corresponding to the propeller torques may be determined (e.g., using relationship(s) in FIG. 15) and a standard deviation between the propeller speeds may be calculated. If the standard deviation does not meet or exceed a stored threshold value, then the system 1000 may re-allocate different random torque values to the propellers. Further, as described above, in some embodiments this standard deviation may vary based on the aircraft's flight conditions. For example, RPM Split 1033*b* may determine a larger speed difference in certain flight conditions where vibrations are more significant, such as when the propeller rotation axis is perpendicular to the aircraft trajectory (e.g., in a lift configuration) and when the aircraft airspeed is higher (indicating greater edgewise airflow). This process may be repeated until a torque allocation that meets the desired spread in propeller speeds is achieved.

In any of the above embodiments, the stored and/or determined propeller speed differences and/or spread parameters (e.g., standard deviation) may be selected to meet a vibration target, noise target, fatigue life target (e.g., of the aircraft structure, frame, and/or equipment), cabin vibration standard, and/or other defined objective (e.g., represented by a constraint, weight, or attractor). For example, RPM Split 1033*b* may store propeller speed differences and/or spread parameters that meet vibration objectives based on modeling and/or testing the effects of the propeller speed on the aircraft's physical vibration and/or vibration of the aircraft's structural components (e.g., aircraft body, propellers, booms, wings etc.). For example, RPM Split 1033*b* may store propeller speed differences and/or spread parameters that meet noise objectives based on modeling and/or testing the effects of the propeller speed on the aircraft's noise emissions (e.g., psychoacoustic noise). Testing may involve physical testing, virtual testing, or machine learning-based testing. In some embodiments, the propeller speed difference may correspond to a difference in the range of a 0.5%-10% difference in propeller speeds between individual propellers.

In some embodiments, RPM Split 1033*b* and/or system 1000 may combine both vibration objectives and noise objectives. For example, propeller speed differences and/or spread parameters may include speed differences and/or spread parameters that meet the more stringent of the two objectives (e.g., the one requiring a greater difference in propeller speeds). In some embodiments, RPM Split 1033*b* and/or system 1000 may prioritize between a vibration objective, a noise objective, and/or other criteria (e.g., other soft constraints described above). In some embodiments, the prioritization may vary based on a phase of flight. For example, a noise objective may be given more weight in a hover phase when the aircraft is landing and/or taking off and closer to people on the ground. In a forward flight phase, the noise objective may be de-prioritized and/or removed.

In some embodiments, before applying the propeller speed changes described above, RPM Split 1033*b* and/or another function of System 1000 may determine whether the aircraft is at a steady state. For example, RPM Split 1033*b* and/or another function of System 1000 may determine whether an aircraft maneuver is being commanded, such as by detecting a pilot input request for a maneuver (e.g., on an inceptor) and/or by detecting a change in requested aircraft state (e.g., change in modeled aircraft state and/or change in at least one of commanded roll, yaw, or pitch). In some embodiments, RPM Split 1033*b* may only apply the propeller speed differences when an aircraft maneuver is not commanded.

At Step 1724, System 1000 may control the flight elements to achieve the commanded aircraft state while varying the propeller speeds. For example, System 1000 may control each propeller of the aircraft based on (e.g., using, dependent upon) the corresponding respective command. For example, System 1000 may command the aircraft propellers (e.g., through a torque command), such that a lift and/or forward thrust is achieved while also maintaining the propeller differences in speed. In some embodiments, RPM Split 1033*b* and/or another function of System 1000 may reference a torque-speed relationship to determine a torque command corresponding to the propeller speed (e.g., FIG. 15).

At Step 1726 the propellers may operate at the commanded speed. At Step 1728 the vibration in the aircraft structure may be improved based on the propellers operating at different speeds, thus reducing the magnitude of vibrations and/or fatigue load caused by of vibrations. Further, in some embodiments, the noise emissions (e.g., a pyschoacoustic noise) may be reduced as described above with reference to Step 1722.

Figure 17B:
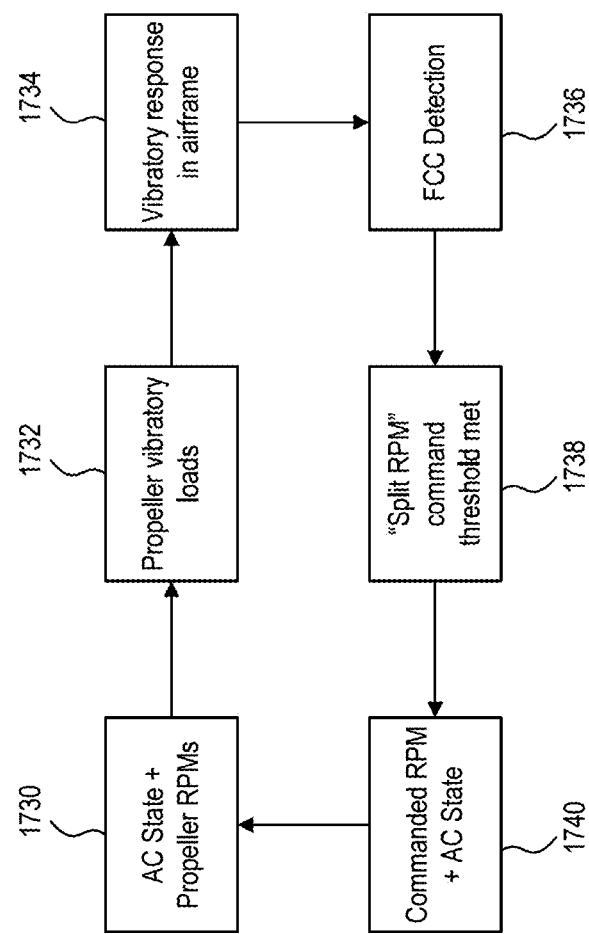
FIG. 17B illustrates another block diagram for vibration attenuation based on splitting propeller speeds across multiple propellers using a feedback configuration, consistent with disclosed embodiments.

FIG. 17B illustrates another block diagram for vibration attenuation based on splitting propeller speeds across multiple propellers using a feedback configuration, consistent with disclosed embodiments. At Step 1736, System 1000 and/or RPM Split 1033*b* may detect a structural vibratory response (e.g., vibration of the aircraft or aircraft components) in the aircraft from Vehicle Sensing 1031. For example, System 1000 may detect aircraft vibration based on measurements from an Inertial Navigation System, inertial measurement unit(s), and/or inertial sensors (e.g., accelerometer, gyroscope, magnetometer). In some embodiments, System 1000 may receive vibration measurements from multi-axis accelerometer(s) (e.g. 3-axis accelerometer) and/or single axis accelerometer(s). In some embodiments, System 1000 and/or RPM Split 1033*b* may additionally and/or alternatively detect noise emissions based on measurements from one or more microphones in and/or on the aircraft.

At Step 1738, System 1000 and/or RPM Split 1033*b* may determine whether the vibration and/or noise (e.g., as measured by at least one accelerometer and/or at least one microphone) meets a threshold requirement to split propeller speeds. For example, a total vibration (e.g., frequency or amplitude) may be compared to a single threshold. Additionally or alternatively, vibration along a first, second, and/or third axis (e.g., longitudinal, vertical, and/or lateral) may be compared to a first, second, and/or third threshold. For example, a lower threshold may be set for vibrations that are particularly undesirable (e.g., vertical cabin vibrations). Further, the vibration measurement(s) for comparison to the threshold(s) may be based on measurements from a combination of inertial sensors. In some embodiments, multiple accelerometers may be placed throughout the aircraft and a total vibration value may be determined based on an average (e.g., a weighted average) of their values. For example, accelerometers may be placed proximate to different structural components (e.g., on the fuselage, on an EPU, on a propeller, on a propeller shaft) and sensitive acceleration values (e.g., values corresponding to a natural frequency of the component) may be weighted more heavily. System 1000 and/or RPM Split 1033*b* may determine whether vibration in the aircraft has exceeded threshold level(s) and/or has exceeded threshold level(s) for a set period of time. In some embodiments, an integrator threshold may be used to determine when to implement a vibration attenuation function (e.g., when an integrator has integrated a threshold amount of vibration over time).

In some embodiments, the threshold may include a range of values, and System 1000 and/or RPM Split 1033*b* may determine that at least one threshold has been met when the vibration values (e.g., amplitude and/or frequency measured by an accelerometer) reflecting the aircraft's structural vibratory response are within the range and/or within the range for a set period of time. For example, in some embodiments ride quality may be prioritized, and threshold requirements may be considered met when a frequency value (e.g., derived from one or more acceleration values) falls within the range of 1 Hz-80 Hz. In some embodiments, system vibration (e.g., vibration of aircraft, structure, frame, and/or equipment) may be prioritized, and threshold requirements may be considered met when the frequency value falls within 5 Hz-2,000 Hz or within 10 Hz-500 Hz. In some embodiments, reducing ride quality vibrations and/or system vibrations may be prioritized over reducing noise emissions.

In some embodiments, System 1000 and/or RPM Split 1033*b* may additionally detect whether one or more noise emissions meet a threshold requirement. For example, a total noise value (e.g. decibel value, Hz value, amplitude value, or any combination thereof), which may be measured from microphone(s), may be compared to threshold value(s). Further, a noise value for comparison to threshold value(s) may be based on measurements from multiple microphones. In some embodiments, multiple microphones may be placed throughout the aircraft and a total noise value may be determined based on an average (e.g., a weighted average) of their values. System 1000 and/or RPM Split 1033*b* may determine whether a noise value in the aircraft has met threshold requirement(s) and/or has met threshold requirement(s) for a set period of time. In some embodiments, an integrator threshold may be used to determine when to implement a vibration attenuation function (e.g., when an integrator has integrated a threshold amount of noise over time). In some embodiments, noise emission threshold requirements may be considered met when the noise value falls within 20 Hz-10,000 Hz or within 20 Hz-1,000 Hz (e.g., as measured by one or more microphones). Optionally, noise emission threshold requirements may be considered met when the noise value falls within 20 Hz-10,000 Hz or within 20 Hz-1,000 Hz (e.g., as measured by one or more microphones) and is below a threshold decibel value (e.g., below 120 dB). In some embodiments, noise threshold requirements may be determined based on measurements from one or more accelerometers. For example, accelerometer measurement threshold requirements that correspond to higher noise emissions may be based on modeling or experimental data that establishes a relationship between accelerometer readings and noise emissions (e.g., detected through a microphone).

In some embodiments, reducing noise emissions may be de-prioritized in comparison to reducing a structural vibratory response, including for example, ride quality vibrations and/or system vibrations. In some embodiments, system 1000 and/or RPM Split 1033*b* may apply a vibration attenuation function to prioritize reducing system vibrations, which may thereby produce a suboptimized result for noise produced by the aircraft. By way of example, applying the vibration attenuation function may reduce vibrations between 5 Hz-2,000 Hz, but may increase vibrations (i.e., that produce noise) at a higher frequency, such as 8,000 Hz. The ranges provided in this disclosure are inclusive of boundary values. For example, within 5 Hz-2,000 Hz includes 5 Hz and 2,000 Hz.

At Step 1740, based on determining that the threshold requirements have been met, RPM Split 1033*b* and/or another function of System 1000 may determine propeller speed(s) and/or torques that satisfy the thrust requirements of the aircraft, while avoiding commanding multiple propellers (e.g., all propellers of the aircraft, a predetermined set of propellers of the aircraft) to the same propeller speed. For example, RPM Split 1033*b* and/or another function of System 1000 may determine propeller speed(s) and/or torques using any of the methods described above with reference to FIG. 17A Step 1722. As described above with reference to FIG. 17A Step 1722, in some embodiments, propeller speeds will not be adjusted to avoid matching propeller speeds when an aircraft maneuver is commanded.

As described above, in some embodiments, reducing a structural vibratory response in the aircraft may be de-prioritized in comparison to reducing noise emissions. For example, in Step 1738 noise may be determined to meet a threshold requirement to split propeller speeds. Split propeller speeds (e.g., propeller parameter(s)) may be determined that meet the commanded lift and/or thrust. System 1000 and/or RPM Split 1033*b* may evaluate the split propeller speeds to determine an expected impact to structural vibration. For example, system 1000 and/or RPM Split 1033*b* may determine whether controlling the propellers at the split RPM speed may increase a structural vibration (e.g., based on being within a propeller speed range associated within undesirable frequencies and/or within another propeller speed keep-out region). In some embodiments, the propellers may be controlled to the split rpm speed based on determining structural vibrations will not increase. In some embodiments, the propellers will not be controlled to the split propeller speed based on determining structural vibrations will increase. If the propellers are not controlled to the split propeller speed, the system 1000 and/or RPM Split 1033*b* may continue to monitor the vibration and/or noise at step 1734.

At Step 1730, System 1000 may control the flight elements to achieve the commanded aircraft state based on the changed propeller speeds. For example, System 1000 may command the aircraft propellers, such that a commanded lift and/or forward thrust is achieved while also maintaining differences in propeller speed. In some embodiments, RPM Split 1033*b* and/or another function of System 1000 may reference a torque-speed relationship to determine a torque command corresponding to the propeller speed (e.g., FIG. 15). At Step 1732, the propellers may operate at the commanded speed. At Step 1734 the aircraft structure vibration may be improved based on the propellers operating at different speeds, thus reducing the magnitude of vibrations and/or fatigue load caused by vibrations. Further, in some embodiments, the sound emissions by the aircraft may be reduced. The vibratory response may be again detected at Step 1736 and the process may repeat.

Figure 17C:
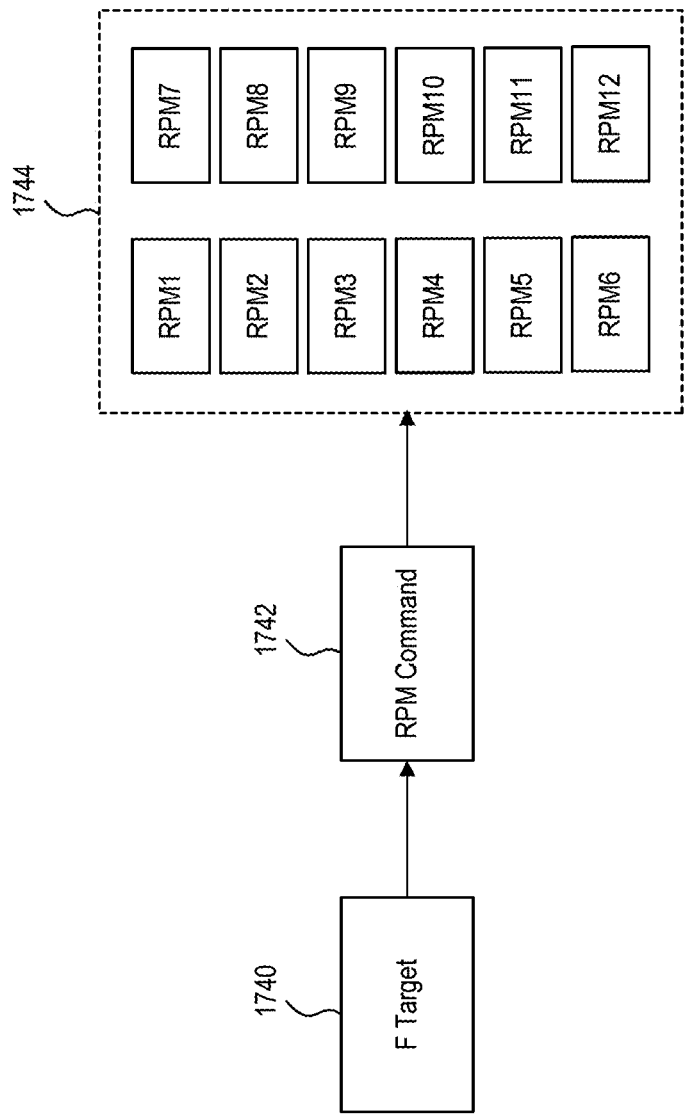
FIG. 17C illustrates a block diagram showing how propeller speed differences are commanded, consistent with disclosed embodiments.

FIG. 17C illustrates a block diagram showing how propeller speed differences are commanded, consistent with disclosed embodiments. At Step 1740, System 1000 may specify a target thrust (e.g., $F_z$). For example, Outer Loop Allocation 1026 and/or Inner Loop 1028 may determine a target thrust for the aircraft based on a pilot input (e.g., pilot input indicating a commanded aircraft state) and one or more control laws. Further, Control Allocation 1029 may determine the amount of thrust for each propeller based on the aircraft thrust requirements. At Step 1742, RPM Split 1033*b* and/or another function of System 1000 may convert the target thrust into electric engine command(s) and/or propeller speed(s) based on a flight phase. For example, RPM Split 1033*b* and/or another function of System 1000 may use one or more aerodynamic models, functions, or lookup tables to determine electric engine command(s) and/or propeller speed(s) to meet the target thrust. At Step 1744, as described above, the determined propeller speeds may be set to avoid commanding multiple propellers (e.g., all propellers of the aircraft, a predetermined set of propellers of the aircraft) to the same propeller speed to improve the aircraft's vibratory response. For example, an optimizer function (e.g., of Control Allocation 1029) may receive a total propeller speed difference and/or a propeller speed differences between different propellers to optimize the vibration. The optimizer function may determine electric engine command(s) for the propellers to operate at different speeds while meeting other aircraft constraints. In some embodiments, the different propeller speeds may be determined to meet a standard (e.g., vibration standard (e.g., ISO-2631), noise standard, fatigue life target of the aircraft structure, frame, and/or equipment, cabin vibration standard, or any other standardization objective).

Figure 17D:
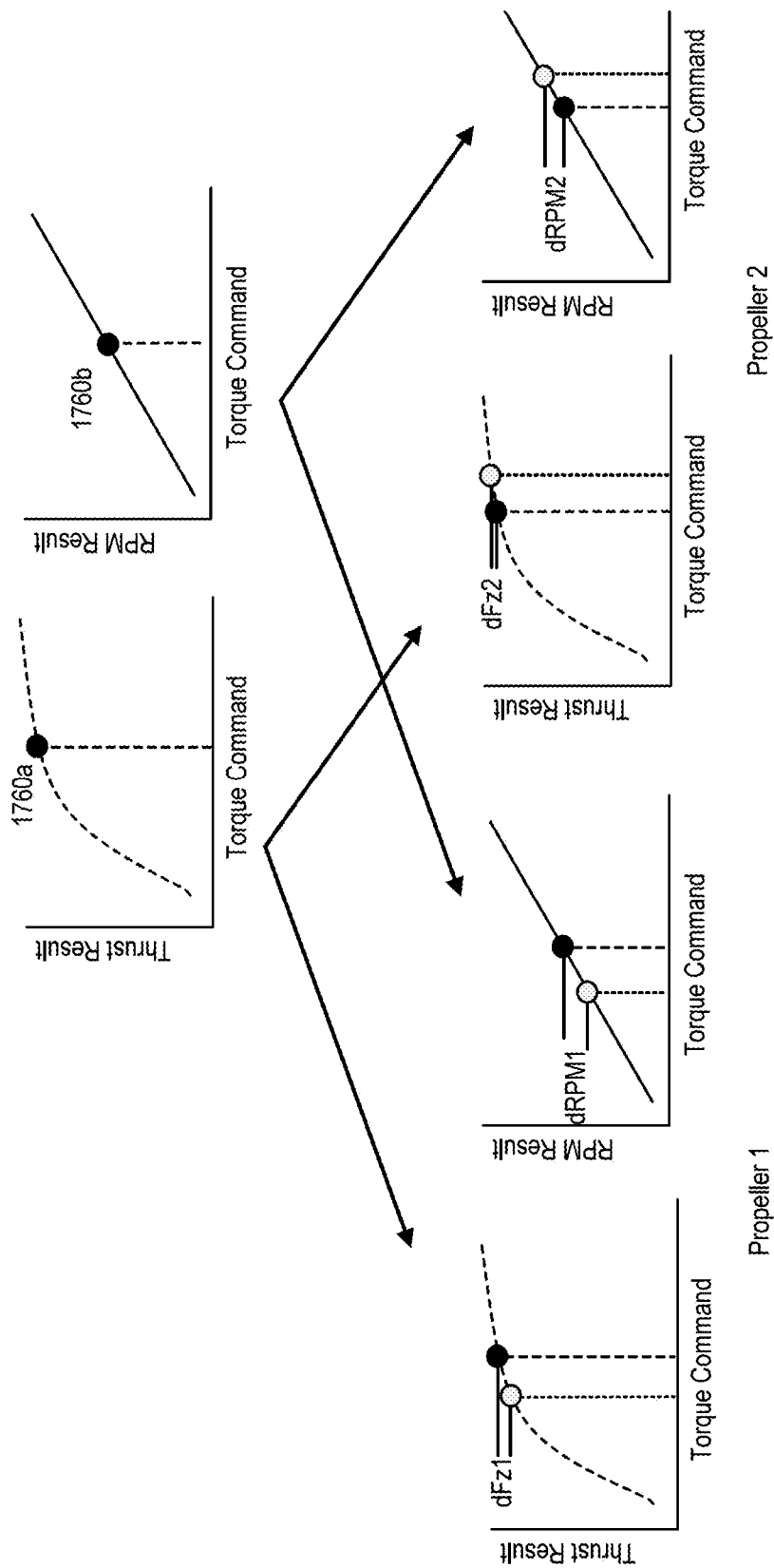
FIG. 17D illustrates torque commands for offsetting propeller speeds, consistent with disclosed embodiments.

FIG. 17D illustrates torque commands for offsetting propeller speeds, consistent with disclosed embodiments. System 1000 may determine at least one thrust command 1760*a* for a propeller based on pilot and/or autopilot input and based on Flight Control Laws and Allocation 1453. For example, System 1000 may determine a thrust command for all propellers to achieve a commanded aircraft state (e.g., thrust vector and/or moment commands). System 1000 may determine a torque command and/or propeller speed 1760*b* that corresponds to the thrust command 1760*a*. For example, System 1000 may use one or more aerodynamic models (e.g., FIG. 15), functions, or lookup tables to determine a corresponding torque command and/or propeller speed to meet the thrust command.

As described above, RPM Split 1033*b* and/or another function of System 1000 may adjust the torque command to create a difference in speed between the propellers, while meeting (e.g., responding to, fulfilling) a commanded aircraft thrust vector and/or moment commands. For example, a determined propeller speed for propeller 1 may be decreased by $dRPM_1$, resulting in a decrease of thrust by $dF_{z1}$. A determined propeller speed for propeller 2 may be increased by $dRPM_2$, resulting in an increase of thrust by $dF_{z2}$. Therefore, a commanded state of the aircraft (e.g., thrust vector and/or moment commands) is met while reducing the impact of propeller vibrations.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent to those skilled in the art from consideration of the specification and practice of the implementations disclosed herein. It is intended that the architectures and circuit arrangements shown in figures are only for illustrative purposes and are not intended to be limited to the specific arrangements and circuit arrangements as described and shown in the figures. It is also intended that the specification and examples be considered as exemplary only, with the true scope and spirit of the invention being indicated by the following claims. The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

CLAUSES

The embodiments may further be described using the following clauses:

1. A method for controlling an aircraft, comprising:
    receiving pilot input indicating a commanded aircraft state;
    determining an aircraft thrust for achieving the commanded aircraft state;
    retrieving at least one propeller parameter associated with propeller speeds, wherein the propeller parameter is determined to reduce a structural vibratory response in the aircraft;
    determining a respective command for each propeller of the aircraft to achieve the determined aircraft thrust based on the at least one propeller parameter; and
    controlling each propeller of the aircraft based on the corresponding respective command.

2. The method of clause 1, further comprising:
    determining whether the commanded aircraft state corresponds to steady state; and
    retrieving the at least one propeller parameter upon determining the commanded aircraft state corresponds to steady state, wherein the steady state comprises at least one of: roll of the aircraft remains constant, yaw of the aircraft remains constant, or pitch of the aircraft remains constant.

3. The method of clause 1 or 2, further comprising:
    receiving sensor data indicating aircraft vibration;
    determining whether the aircraft vibration exceeds a threshold based on the received sensor data; and retrieving the at least one propeller parameter upon determining the aircraft vibration exceeds the threshold.
4. The method of any of clauses 1-3, wherein the at least one propeller parameter indicates a difference in propeller speeds to be applied across propellers of the aircraft.
5. The method of any of clauses 1-4, wherein the at least one propeller parameter indicates at least one of: a total difference in propeller speed across all propellers of the aircraft or a difference in propeller speed between pairs of propellers of the aircraft.
6. The method of any of clauses 1-5, wherein the respective command for each propeller of the aircraft is determined based on determining a combination of propeller commands that results in each propeller of the aircraft being controlled to a different speed.
7. The method of clause 6,
 wherein determining the respective command for each propeller of the aircraft to meet the determined aircraft thrust based on the at least one propeller parameter further comprises:
  determining, for each propeller of the aircraft, an initial propeller command to meet the determined thrust;
  randomly adjusting the initial propeller command based on the at least one propeller parameter; and
  determining whether the randomly adjusted propeller commands provide the determined thrust.
8. The method of any of clauses 1-7,
 wherein the at least one propeller parameter indicates a difference in propeller speeds to be applied across propellers of the aircraft;
 wherein the method further comprises determining the difference in propeller speeds based on at least one of an airspeed or a propeller angle.
9. The method of clause 8, further comprising:
 increasing the difference in propeller speeds based on the airspeed and the propeller angle indicating greater edgewise airflow.
10. The method of any of clauses 1-9, wherein the at least one propeller parameter indicates a propeller speed range to avoid.
11. The method of any of clauses 1-10,
 wherein the at least one propeller parameter comprises at least two propeller speed avoidance ranges; and
 the method further comprising:
 retrieving a larger propeller speed avoidance range based on the airspeed and propeller angle indicating greater edgewise airflow.
12. The method of any of clauses 1-11, wherein the at least one propeller parameter indicates at least one of: a propeller speed range to avoid, a propeller speed range to maintain, or a target propeller speed outside a propeller speed range to avoid.
13. The method of any of clauses 1-12,
 wherein the at least one propeller parameter indicates a respective target propeller speed for each propeller of the aircraft; and
 wherein determining the respective command for each propeller of the aircraft to meet the determined thrust based on the at least one propeller parameter comprises:
  applying the propeller parameter indicating a respective target propeller speed as an attractor in an allocation function, wherein the allocation function determines a combination of propeller commands that achieve the determined thrust.
14. The method of any of clauses 1-13, further comprising: varying the at least one propeller parameter based on at least one of: an airspeed of the aircraft or a propeller angle.
15. The method of any of clauses 1-14, further comprising:
 receiving first sensor data indicating an airspeed of the aircraft;
 receiving second sensor data indicating a propeller angle; and
 varying the at least one propeller parameter based on the first sensor data and the second sensor data.
16. The method of any of clauses 1-15, wherein:
 the at least one propeller parameter is a torque; and
 the method further comprises determining the at least one propeller parameter based on a relationship between propeller speed and torque, wherein the relationship between propeller speed and torque varies based on a flight phase of the aircraft.
17. The method of any of clauses 1-16, further comprising:
 receiving sensor data indicating a propeller speed of each propeller of the aircraft; and
 determining the command for each propeller of the aircraft based on the at least one propeller parameter and the sensor data for the corresponding propeller.
18. The method of any of clauses 1-17, further comprising:
 receiving sensor data indicating a propeller speed of each propeller; and
 adjusting the determined command based on the received sensor data for the corresponding propeller, wherein controlling each propeller of the aircraft is based on the adjusted command.
19. The method of any of clauses 1-18,
 wherein the at least one propeller parameter comprises at least two parameters;
 wherein a first parameter indicates a propeller speed avoidance range;
 wherein a second parameter indicates a difference in propeller speeds to be applied across propellers of the aircraft; and
 wherein determining a respective command for each propeller of the aircraft comprises prioritizing the first parameter over the second parameter.
20. The method of any of clauses 1-19,
 wherein the at least one propeller parameter varies based on a flight condition of the aircraft; and
 wherein the method further comprises:
  repeatedly retrieve the at least one propeller parameter and control the aircraft based on the at least one propeller parameter throughout a flight of the aircraft.
21. The method of any of claims 1-20,
 wherein the propeller parameter is based on experimental testing or modeling the impacts of propeller speeds on the structural vibratory response of at least one of: a body of the aircraft, a boom of the aircraft, a propeller of the aircraft, or a wing of the aircraft.
22. The method of any of clauses 1-21, wherein the propeller parameter indicates a standard deviation required across the propeller speeds.
23. The method of clause 22, further comprising:
 randomly allocate torque values to each of the propellers to meet the determined thrust;

determine whether the random allocation of propeller torques meets the required standard deviation of propeller speeds;
repeat the random allocation of torque values upon determining the standard deviation of propeller speeds is not met; and
determine a respective command for each propeller of the aircraft upon determining the standard deviation of propeller speeds is met.
24. The method of any of clauses 1-23,
wherein the respective command is determined to maintain a trim state of the aircraft.
25. The method of any of clauses 1-24, further comprising:
retrieving a second propeller parameter, wherein the second propeller parameter is determined to reduce a noise emission of the aircraft;
determining whether the aircraft can be controlled according to the second propeller parameter without increasing a structural vibratory response in the aircraft; and
controlling each propeller of the aircraft based on the second propeller parameter upon determining the structural vibratory response in the aircraft will not increase.
26. An electrical system, comprising at least one processor configured to execute instructions to cause the system to perform any of clauses 1-25.
27. A computer-readable storage medium storing instructions which, when executed by at least one processor, cause the at least one processor to perform the method of any of clauses 1-25.
28. An aircraft comprising at least one processor configured to perform any of clauses 1-25.

The invention claimed is:
1. An electrical system for an aircraft, comprising:
at least one processor configured to execute instructions to cause the system to:
receive pilot input indicating a commanded aircraft state;
determine an aircraft thrust for achieving the commanded aircraft state;
determine a difference in speed between at least two propellers that reduces a structural vibratory response in the aircraft;
determine a respective command for each propeller of the aircraft to achieve the determined aircraft thrust while also meeting the determined speed difference; and
control each propeller of the aircraft based on the corresponding respective command.
2. The electrical system of claim 1, wherein the at least one processor is further configured to:
determine whether the commanded aircraft state corresponds to steady state; and
determine the difference in speed between the at least two propellers upon determining the commanded aircraft state corresponds to steady state, wherein the steady state comprises at least one of: roll of the aircraft remains constant, yaw of the aircraft remains constant, or pitch of the aircraft remains constant.
3. The electrical system of claim 1, wherein the at least one processor is further configured to:
receive sensor data indicating aircraft vibration;
determine whether the aircraft vibration exceeds a threshold based on the received sensor data; and
determine the difference in speed between the at least two propellers upon determining the aircraft vibration exceeds the threshold.
4. The electrical system of claim 1, wherein the difference in speed between the at least two propellers is a total difference in propeller speed to be applied across all propellers of the aircraft.
5. The electrical system of claim 1, wherein the respective command for each propeller of the aircraft is determined based on determining a combination of propeller commands that results in each propeller of the aircraft being controlled to a different speed.
6. The electrical system of claim 5,
wherein determining the respective command for each propeller of the aircraft to meet the determined aircraft thrust while also meeting the determined speed difference further comprises:
determining, for each propeller of the aircraft, an initial propeller command to meet the determined thrust;
randomly adjusting the initial propeller command based on the determined speed difference; and
determining whether the randomly adjusted propeller commands provide the determined thrust.
7. The electrical system of claim 1, wherein:
the difference in speed is based on at least one of an airspeed or a propeller angle.
8. The electrical system of claim 7,
wherein the difference in speed is increased when the airspeed and the propeller angle indicates an increase in edgewise airflow.
9. The electrical system of claim 1, wherein the at least one processor is further configured to determine a propeller speed range to avoid.
10. The electrical system of claim 1,
wherein the at least one processor is further configured to determine—
at least two propeller speed avoidance ranges; and
increase a propeller speed avoidance range based on an airspeed of the aircraft and a propeller angle indicating an increase in edgewise airflow.
11. The electrical system of claim 1,
wherein the at least one processor is further configured to determine
a respective target propeller speed for each propeller of the aircraft; and
wherein determining the respective command for each propeller of the aircraft to meet the determined thrust while also meeting the determined speed difference comprises:
applying the respective target propeller speed as an attractor in an allocation function, wherein the allocation function determines a combination of propeller commands that achieve the determined thrust.
12. The electrical system of claim 1, wherein the at least one processor is further configured to vary the the difference in speed based on at least one of: an airspeed of the aircraft or a propeller angle.
13. The electrical system of claim 1, wherein the at least one processor is further configured to:
receive first sensor data indicating an airspeed of the aircraft;
receive second sensor data indicating a propeller angle; and
vary the difference in speed based on the first sensor data and the second sensor data.

14. The electrical system of claim 1, wherein:
each of the respective commands are a torque command and
the at least one processor is further configured to determine the torque command based on a relationship between propeller speed and torque, wherein the relationship between propeller speed and torque varies based on a flight phase of the aircraft.

15. The electrical system of claim 1, wherein the at least one processor is further configured to:
receive sensor data indicating a propeller speed of each propeller of the aircraft; and
determine the command for each propeller of the aircraft based on the difference in speed and the sensor data for the corresponding propeller.

16. The electrical system of claim 1, wherein the at least one processor is further configured to:
receive sensor data indicating a propeller speed of each propeller; and
adjust the determined command based on the received sensor data for the corresponding propeller, wherein controlling each propeller of the aircraft is based on the adjusted command.

17. The electrical system of claim 1,
wherein the at least one processor is further configured to determine a propeller speed avoidance range; and
determine a respective command for each propeller of the aircraft by prioritizing the propeller speed avoidance range over the difference in speed.

18. The electrical system of claim 1,
wherein the difference in speed varies based on a flight condition of the aircraft; and
wherein the at least one processor is further configured to:
repeatedly determine the difference in speed and control the aircraft based on the difference in speed during a flight of the aircraft.

19. The electrical system of claim 1,
wherein the difference in speed is based on experimental testing or modeling impacts of propeller speeds on the structural vibratory response of at least one of: a body of the aircraft, a boom of the aircraft, a propeller of the aircraft, or a wing of the aircraft.

20. The electrical system of claim 1,
wherein the respective command is determined to maintain a trim state of the aircraft.

21. The electrical system of claim 1,
wherein the at least one processor is further configured to:
determine a propeller parameter to reduce a noise emission of the aircraft;
determine whether the aircraft can be controlled according to the propeller parameter without increasing a structural vibratory response in the aircraft; and
control each propeller of the aircraft based on the propeller parameter upon determining the structural vibratory response in the aircraft will not increase.

22. The electrical system of claim 1,
wherein the at least one processor is further configured to:
receive sensor data indicating aircraft vibration;
determine whether the aircraft vibration is in a range of 1 Hz to 5,000 Hz based on the received sensor data; and
determine the difference in speed between the at least two propellers upon determining the aircraft vibration is in the range.

23. The electrical system of claim 1,
wherein the at least one processor is further configured to:
receive sensor data indicating an aircraft noise;
determine whether the noise is in a range of 20 Hz to 10,000 Hz;
determine an effect that controlling propellers of the aircraft to reduce the noise will have on the structural vibratory response in the aircraft; and
control each propeller of the aircraft to reduce the noise upon determining that the noise is in the range and the control of the propellers will have a positive or neutral effect on reducing a structural vibratory response.

24. An aircraft, comprising:
at least two propellers;
at least one processor configured to:
receive pilot input indicating a commanded aircraft state;
determine an aircraft thrust for achieving the commanded aircraft state;
determine a difference in speed between the at least two propellers that reduces a structural vibratory response in the aircraft;
determine a respective command for each propeller of the aircraft to achieve the determined aircraft thrust while also meeting the determined speed difference; and
control each propeller of the aircraft based on the corresponding respective command.

25. A method for controlling an aircraft, comprising:
receiving, using at least one hardware processor, pilot input indicating a commanded aircraft state;
determining, using the at least one hardware processor, an aircraft thrust for achieving the commanded aircraft state;
determining, using the at least one hardware processor, a difference in speed between at least two propellers that reduces a structural vibratory response in the aircraft;
determining, using the at least one hardware processor, a respective command for each propeller of the aircraft to achieve the determined aircraft thrust while also meeting the determined speed difference; and
controlling, using the at least one hardware processor, each propeller of the aircraft based on the corresponding respective command.

26. The method of claim 25, further comprising:
receiving, using the at least one hardware processor, sensor data indicating aircraft vibration;
determining, using the at least one hardware processor, whether the aircraft vibration exceeds a threshold based on the received sensor data; and
determining, using the at least one hardware processor, the difference in speed between the at least two propellers upon determining the aircraft vibration exceeds the threshold.

27. The method of claim 25, wherein the difference in speed is based on at least one of an airspeed or a propeller angle.

28. The method of claim 25, further comprising determining, using the at least one hardware processor, a propeller speed range to avoid.

29. An electrical system for an aircraft, comprising:
at least one processor configured to execute instructions to cause the system to:
receive pilot input indicating a commanded aircraft state;
determine an aircraft thrust for achieving the commanded aircraft state;

determine a standard deviation in propeller speed across propellers of the aircraft that reduces a structural vibratory response in the aircraft;

determine a respective command for each propeller of the aircraft to achieve the determined aircraft thrust while also meeting the standard deviation in propeller speed; and control each propeller of the aircraft based on the corresponding respective command.

30. The electrical system of claim 29, wherein the at least one processor is further configured to:

randomly allocate torque values to each of the propellers to meet the determined thrust;

determine whether the random allocation of propeller torques meets the standard deviation of propeller speed;

repeat the random allocation of torque values upon determining the standard deviation of propeller speed is not met; and determine a respective command for each propeller of the aircraft upon determining the standard deviation of propeller speed is met.

\* \* \* \* \*